United States Patent
Liao et al.

(10) Patent No.: US 12,117,569 B2
(45) Date of Patent: Oct. 15, 2024

(54) DYNAMIC CALIBRATION OF LIDAR SENSORS

(71) Applicant: Cepton Technologies, Inc., San Jose, CA (US)

(72) Inventors: Dongyi Liao, Mountain View, CA (US); Zukai Wang, San Jose, CA (US); Mark A. McCord, Los Gatos, CA (US); Chao Gu, Ottawa (CA)

(73) Assignee: Cepton Technologies, Inc., San Jose, CA (US)

( * ) Notice: Subject to any disclaimer, the term of this patent is extended or adjusted under 35 U.S.C. 154(b) by 892 days.

(21) Appl. No.: 17/069,733

(22) Filed: Oct. 13, 2020

(65) Prior Publication Data
US 2021/0109205 A1 Apr. 15, 2021

Related U.S. Application Data

(60) Provisional application No. 62/915,563, filed on Oct. 15, 2019.

(51) Int. Cl.
  *G01S 7/497* (2006.01)
  *G01B 11/06* (2006.01)
  (Continued)

(52) U.S. Cl.
  CPC ........ *G01S 7/4972* (2013.01); *G01B 11/0608* (2013.01); *G01S 7/4808* (2013.01);
  (Continued)

(58) Field of Classification Search
  CPC .... G01S 7/4972; G01S 17/931; G01S 17/894; G01S 7/4811; G01S 7/80; G01S 17/86;
  (Continued)

(56) References Cited

U.S. PATENT DOCUMENTS 9,052,721 B1 6/2015 Dowdall et al.
9,383,753 B1 7/2016 Templeton et al.
(Continued)

FOREIGN PATENT DOCUMENTS

CN 207557468 U 6/2018
JP 2019-516101 A 6/2019

OTHER PUBLICATIONS

"Rigid body dynamics," Wikipedia, downloaded Dec. 27, 2023 from https://en.wikipedia.org/wiki/Rigid_body_dynamics, 17 pages. (Year: 2023).*

(Continued)

*Primary Examiner* — Daniel L Murphy
(74) *Attorney, Agent, or Firm* — Kilpatrick Townsend & Stockton LLP

(57) ABSTRACT

A method of calibrating a LiDAR sensor mounted on a vehicle includes storing a reference three-dimensional image acquired by the LiDAR sensor while the LiDAR sensor is in an expected alignment with respect to the vehicle. The reference three-dimensional image includes a first image of a fixed feature on the vehicle. The method further includes, acquiring, using the LiDAR sensor, a three-dimensional image including a second image of the fixed feature, and determining a deviation from the expected alignment of the LiDAR sensor with respect to the vehicle by comparing the second image of the fixed feature in the three-dimensional image to the first image of the fixed feature in the reference three-dimensional image.

20 Claims, 18 Drawing Sheets

(51) Int. Cl.

| | |
|---|---|
| *G01S 7/48* | (2006.01) |
| *G01S 7/481* | (2006.01) |
| *G01S 17/86* | (2020.01) |
| *G01S 17/89* | (2020.01) |
| *G01S 17/894* | (2020.01) |
| *G01S 17/931* | (2020.01) |
| *G06T 7/80* | (2017.01) |
| *G06T 19/20* | (2011.01) |
| *G05D 1/00* | (2006.01) |
| *G05D 1/249* | (2024.01) |

(52) U.S. Cl.
CPC ............. *G01S 7/481* (2013.01); *G01S 7/4811* (2013.01); *G01S 17/86* (2020.01); *G01S 17/89* (2013.01); *G01S 17/894* (2020.01); *G01S 17/931* (2020.01); *G06T 7/80* (2017.01); *G06T 19/20* (2013.01); *G05D 1/0231* (2013.01); *G05D 1/249* (2024.01); *G06T 2207/10028* (2013.01); *G06T 2207/30252* (2013.01); *G06T 2219/20* (2013.01)

(58) Field of Classification Search
CPC ........ G01S 7/4808; G01S 7/481; G01S 17/89; G06T 19/20; G06T 2219/20; G06T 2207/10028; G06T 2207/30252; G06T 7/80; G06T 2200/04; G06T 2207/30204; G05D 2201/0213; G05D 1/0231
USPC ........................................................ 356/5.01

See application file for complete search history.

(56) References Cited

U.S. PATENT DOCUMENTS

| | | | | |
|---|---|---|---|---|
| 9,866,816 | B2* | 1/2018 | Retterath | ............. H04N 13/296 |
| 10,127,461 | B2* | 11/2018 | Viswanathan | .......... G06T 7/269 |
| 10,210,406 | B2* | 2/2019 | Huang | ...................... G01S 5/16 |
| 10,401,501 | B2 | 9/2019 | Wood | |
| 10,843,669 | B2* | 11/2020 | Leach | ....................... B60S 1/56 |
| 2015/0153453 | A1* | 6/2015 | Kane | ...................... G01S 17/42 |
| | | | | 356/5.01 |
| 2016/0161602 | A1 | 6/2016 | Prokhorov | |
| 2018/0108150 | A1* | 4/2018 | Curtis | .................... G06T 7/246 |
| 2019/0056483 | A1 | 2/2019 | Bradley et al. | |
| 2019/0056484 | A1 | 2/2019 | Bradley et al. | |
| 2019/0204427 | A1 | 7/2019 | Abari et al. | |
| 2020/0116867 | A1 | 4/2020 | Zhu | |

OTHER PUBLICATIONS

International Search Report and Written Opinion of the International Searching Authority mailed Mar. 16, 2021 in related corresponding International Application No. PCT/US20/55503, filed Oct. 14, 2020 (eleven pages).

Non-Final Office Action dated Sep. 28, 2023 in related U.S. Appl. No. 17/069,727 (eight pages).

Invitation to Pay Additional Fees and, Where Applicable, Protest Fee mailed Jan. 11, 2021 in related International Application No. PCT/US2020/055503 (two pages).

International Preliminary Report on Patentability and Written Opinion of the International Searching Authority mailed Apr. 28, 2022 in related International Application No. PCT/US2020/055503 (eight pages).

Notice of Allowance dated Feb. 1, 2024 in related U.S. Appl. No. 17/069,727 (ten pages).

* cited by examiner

LiDAR is aligned, vehicle has pitch error

Vehicle is aligned, LiDAR has pitch error

LiDAR is aligned, vehicle has roll error

Vehicle is aligned, LiDAR has roll error

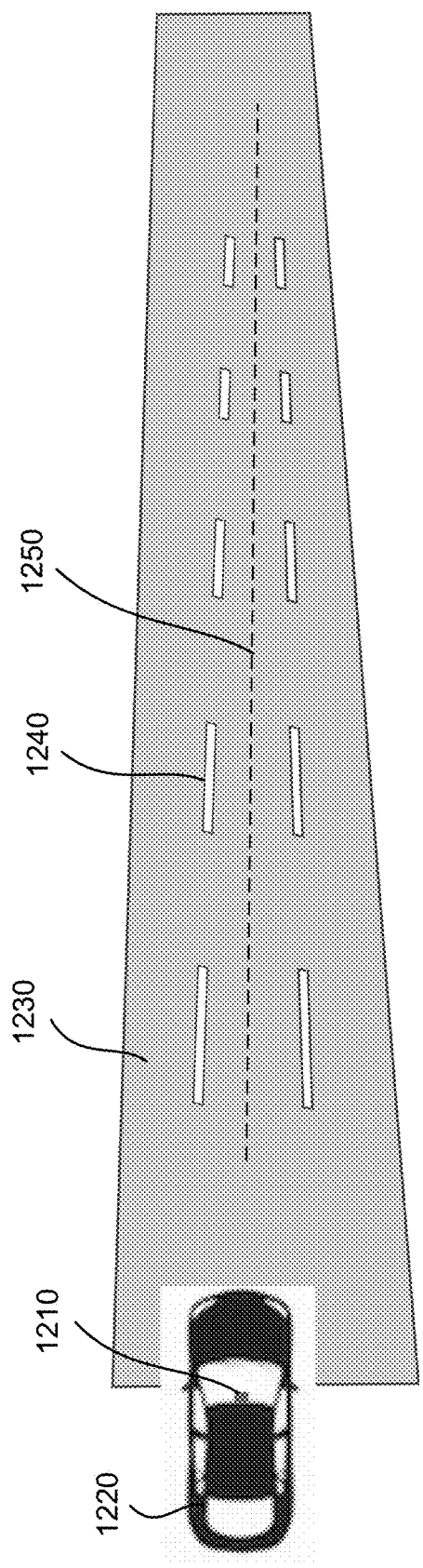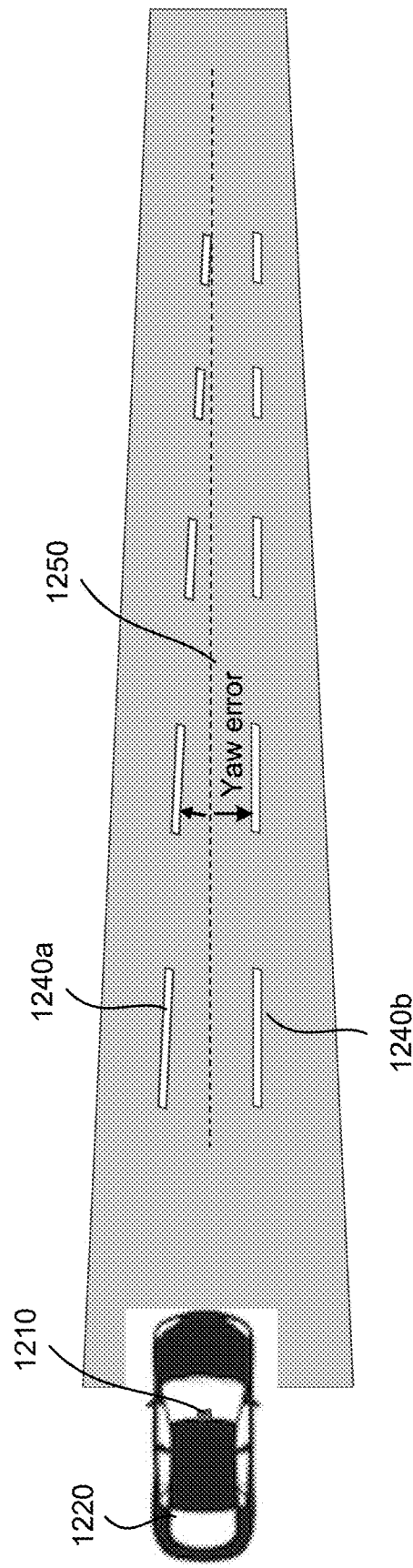
FIG. 12A
FIG. 12B

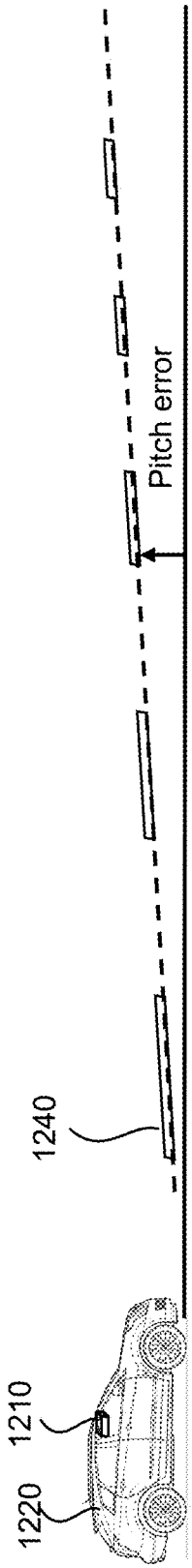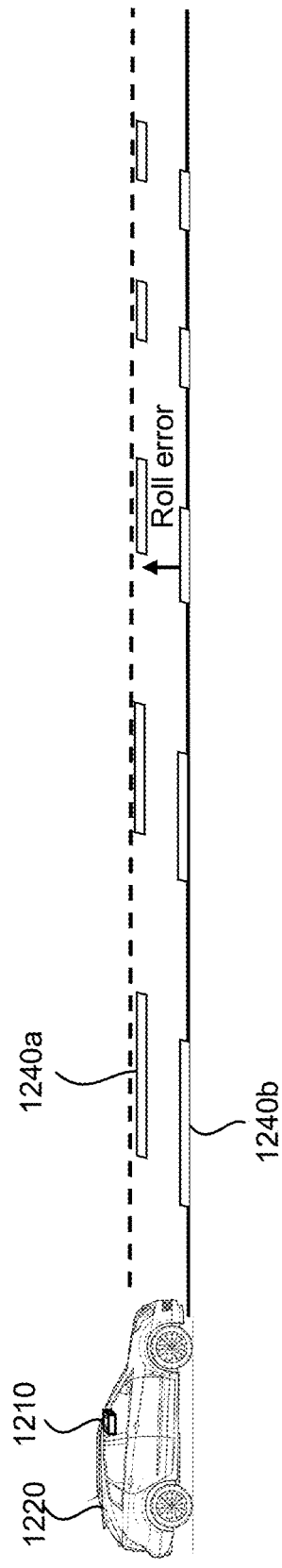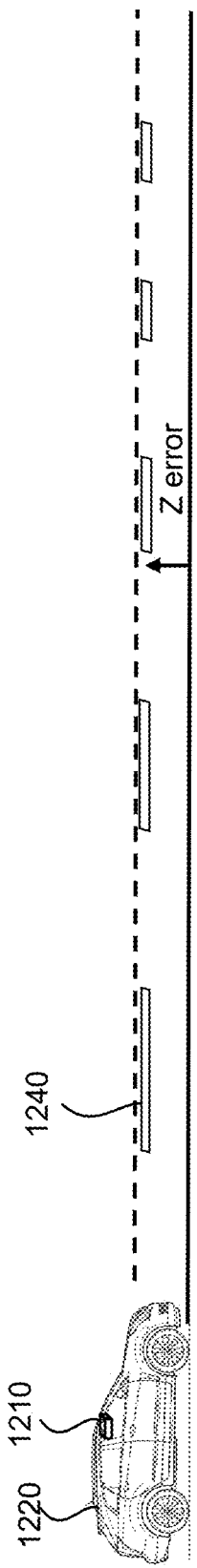
FIG. 13A
FIG. 13B
FIG. 13C

DYNAMIC CALIBRATION OF LIDAR SENSORS

CROSS-REFERENCES TO RELATED APPLICATIONS

This application claims the benefit of U.S. Provisional Patent Application No. 62/915,563, filed on Oct. 15, 2019, the content of which is incorporated by reference in its entirety.

The following two U.S. Patent Applications (including this one) are being filed concurrently, and the entire disclosure of the other application is incorporated by reference into this application for all purposes:

Application Ser. No. 17/069,727, filed on Oct. 13, 2020, entitled "CALIBRATION OF LIDAR SENSORS," and Application Ser. No. 17/069,733, filed on Oct. 13, 2020, entitled "DYNAMIC CALIBRATION OF LIDAR SENSORS."

BACKGROUND

Three-dimensional sensors can be applied in autonomous vehicles, drones, robotics, security applications, and the like. LiDAR sensors are a type of three-dimensional sensors that can achieve high angular resolutions appropriate for such applications. A LiDAR sensor can include one or more laser sources for emitting laser pulses, and one or more detectors for detecting reflected laser pulses. The LiDAR sensor measures the time it takes for each laser pulse to travel from the LiDAR sensor to an object within the sensor's field of view, then bounce off the object and return to the LiDAR sensor. Based on the time of flight of the laser pulse, the LiDAR sensor determines how far away the object is from the LiDAR sensor. By scanning across a scene, a three-dimensional image of the scene may be obtained.

For accurate measurements, the orientation of the optical axis of a LiDAR sensor may need to be calibrated with respect to some mechanical datum point, such as mounting holes on a case of the LiDAR sensor. Additionally, when mounted in a vehicle, the position and the orientation of the LiDAR sensor may need to be calibrated with respect to the vehicle. Such calibrations can be performed, for example, in a manufacturer's plant. In the event of a crash or other mechanical disturbance to the LiDAR sensor, its calibration with respect to either the case or the vehicle might change. Thus, it may be desirable to be able to detect a loss of calibration accuracy and to correct the calibration, so as to ensure safe and accurate long term operation of a LiDAR sensor.

SUMMARY

According to some embodiments, a method of calibrating a LiDAR sensor mounted on a vehicle includes positioning the vehicle at a distance from a target. The target includes a planar mirror and features surrounding the mirror. The optical axis of the mirror is substantially horizontal. The vehicle is positioned and oriented relative to the mirror so that an optical axis of the LiDAR sensor is nominally parallel to the optical axis of the mirror, and the target is nominally centered at a field of view of the LiDAR sensor. The method further includes acquiring, using the LiDAR sensor, a three-dimensional image of the target. The three-dimensional image of the target includes images of the features of the target and a mirror image of the vehicle formed by the mirror. The method further includes determining a deviation from an expected alignment of the LiDAR sensor with respect to the vehicle by analyzing the images of the features and the mirror image of the vehicle in the three-dimensional image of the target.

According to some embodiments, a method of calibrating a LiDAR sensor mounted on a vehicle includes storing a reference three-dimensional image acquired by the LiDAR sensor while the LiDAR sensor is in an expected alignment with respect to the vehicle. The reference three-dimensional image includes a first image of a fixed feature on the vehicle. The method further includes, acquiring, using the LiDAR sensor, a three-dimensional image including a second image of the fixed feature, and determining a deviation from the expected alignment of the LiDAR sensor with respect to the vehicle by comparing the second image of the fixed feature in the three-dimensional image to the first image of the fixed feature in the reference three-dimensional image.

According to some embodiments, a method of calibrating a LiDAR sensor mounted on a vehicle includes acquiring, using the LiDAR sensor while the vehicle is traveling on a road with fixed road features, one or more three-dimensional images. Each of the one or more three-dimensional images includes images of the road features. The method further includes analyzing a spatial relationship between the images of the road features in the one or more three-dimensional images and an orientation of a field of view of the LiDAR sensor, and determining a deviation from an expected alignment of the LiDAR sensor with respect to the vehicle based on the spatial relationship between the images of the road features and the field of view of the LiDAR sensor.

BRIEF DESCRIPTION OF THE DRAWINGS

FIGS. 12A-12B and FIGS. 13A-13C illustrate a method of dynamic calibration of a LiDAR sensor mounted on a vehicle using lane markings on a road according to some embodiments.

DETAILED DESCRIPTION

According to some embodiments, methods of calibrating a LiDAR sensor mounted on a vehicle are provided. The calibration may not require returning the vehicle with the LiDAR sensor mounted thereon to a manufacturer's plant or a repair shop. Calibrations can be performed periodically or continuously while the vehicle is parked or even during driving.

Figure 1:
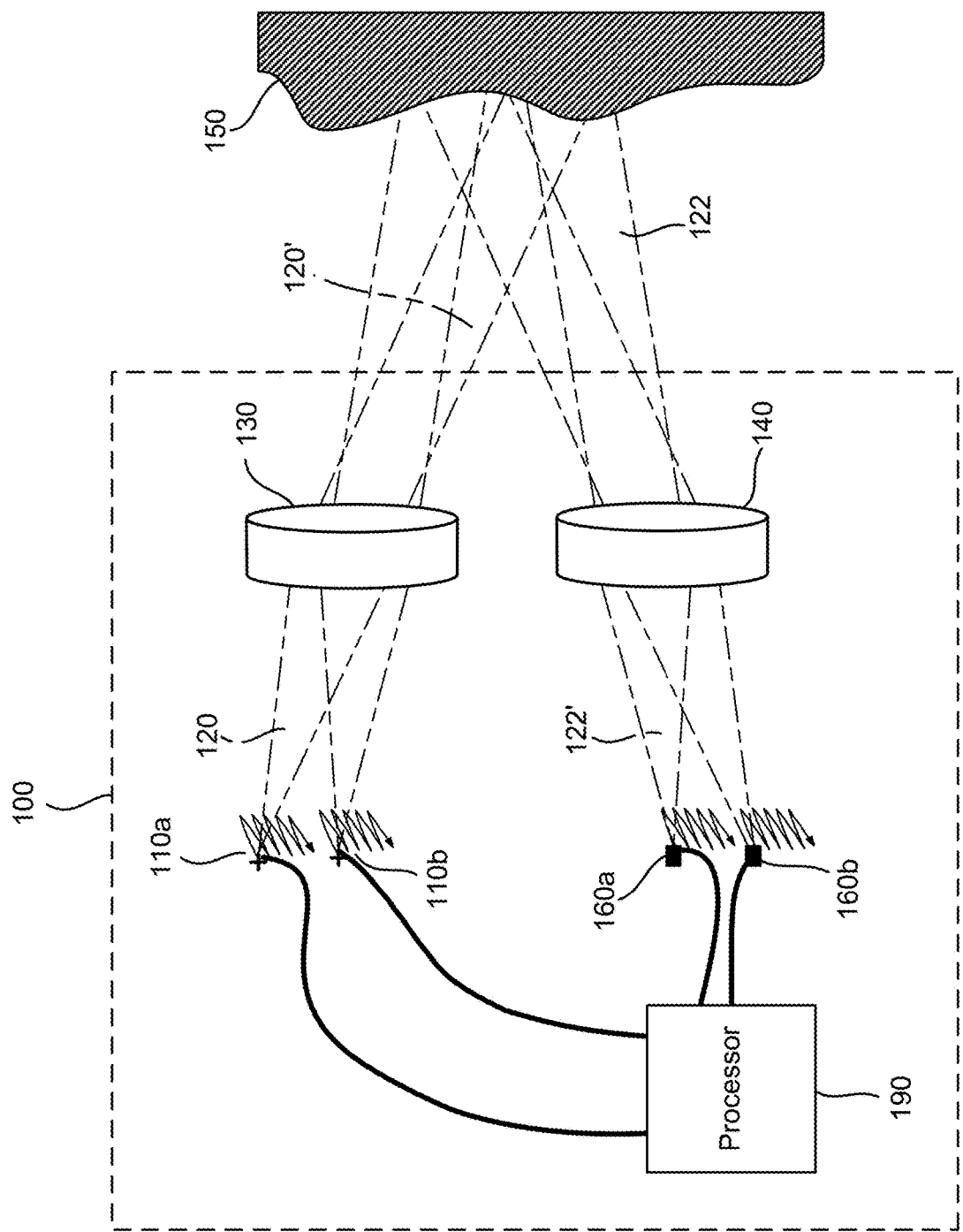
FIG. 1 illustrates an exemplary LiDAR sensor for three-dimensional imaging according to some embodiments.

FIG. 1 illustrates an exemplary LiDAR sensor 100 for three-dimensional imaging according to some embodiments. The LiDAR sensor 100 includes an emission lens 130 and a receiving lens 140. The LiDAR sensor 100 includes a light source 110a disposed substantially in a back focal plane of the emission lens 130. The light source 110a is operative to emit a light pulse 120 from a respective emission location in the back focal plane of the emission lens 130. The emission lens 130 is configured to collimate and direct the light pulse 120 toward an object 150 located in front of the LiDAR sensor 100. For a given emission location of the light source 110a, the collimated light pulse 120' is directed at a corresponding angle toward the object 150.

A portion 122 of the collimated light pulse 120' is reflected off of the object 150 toward the receiving lens 140. The receiving lens 140 is configured to focus the portion 122' of the light pulse reflected off of the object 150 onto a corresponding detection location in the focal plane of the receiving lens 140. The LiDAR sensor 100 further includes a detector 160a disposed substantially at the focal plane of the receiving lens 140. The detector 160a is configured to receive and detect the portion 122' of the light pulse 120 reflected off of the object at the corresponding detection location. The corresponding detection location of the detector 160a is optically conjugate with the respective emission location of the light source 110a.

The light pulse 120 may be of a short duration, for example, 10 ns pulse width. The LiDAR sensor 100 further includes a processor 190 coupled to the light source 110a and the detector 160a. The processor 190 is configured to determine a time of flight (TOF) of the light pulse 120 from emission to detection. Since the light pulse 120 travels at the speed of light, a distance between the LiDAR sensor 100 and the object 150 may be determined based on the determined time of flight.

One way of scanning the laser beam 120' across a FOV is to move the light source 110a laterally relative to the emission lens 130 in the back focal plane of the emission lens 130. For example, the light source 110a may be raster scanned to a plurality of emission locations in the back focal plane of the emission lens 130 as illustrated in FIG. 1. The light source 110a may emit a plurality of light pulses at the plurality of emission locations. Each light pulse emitted at a respective emission location is collimated by the emission lens 130 and directed at a respective angle toward the object 150, and impinges at a corresponding point on the surface of the object 150. Thus, as the light source 110a is raster scanned within a certain area in the back focal plane of the emission lens 130, a corresponding object area on the object 150 is scanned. The detector 160a may be raster scanned to be positioned at a plurality of corresponding detection locations in the focal plane of the receiving lens 140, as illustrated in FIG. 1. The scanning of the detector 160a is typically performed synchronously with the scanning of the light source 110a, so that the detector 160a and the light source 110a are always optically conjugate with each other at any given time.

By determining the time of flight for each light pulse emitted at a respective emission location, the distance from the LiDAR sensor 100 to each corresponding point on the surface of the object 150 may be determined. In some embodiments, the processor 190 is coupled with a position encoder that detects the position of the light source 110a at each emission location. Based on the emission location, the angle of the collimated light pulse 120' may be determined. The X-Y coordinate of the corresponding point on the surface of the object 150 may be determined based on the angle and the distance to the LiDAR sensor 100. Thus, a three-dimensional image of the object 150 may be constructed based on the measured distances from the LiDAR sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return light pulse 122' is measured and used to adjust the power of subsequent light pulses from the same emission point, in order to prevent saturation of the detector, improve eye-safety, or reduce overall power consumption. The power of the light pulse may be varied by varying the duration of the light pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the reflectivity, as determined by the intensity of the detected pulse, may also be used to add another dimension to the image. For example, the image may contain X, Y, and Z coordinates, as well as reflectivity (or brightness).

The angular field of view (AFOV) of the LiDAR sensor 100 may be estimated based on the scanning range of the light source 110a and the focal length of the emission lens 130 as, $$AFOV = 2\tan^{-1}\left(\frac{h}{2f}\right),$$

where h is scan range of the light source 110a along certain direction, and f is the focal length of the emission lens 130. For a given scan range h, shorter focal lengths would produce wider AFOVs. For a given focal length f, larger scan ranges would produce wider AFOVs. In some embodiments, the LiDAR sensor 100 may include multiple light sources disposed as an array at the back focal plane of the emission lens 130, so that a larger total AFOV may be achieved while keeping the scan range of each individual light source relatively small. Accordingly, the LiDAR sensor 100 may include multiple detectors disposed as an array at the focal plane of the receiving lens 140, each detector being conjugate with a respective light source. For example, the LiDAR sensor 100 may include a second light source 110b and a second detector 160b, as illustrated in FIG. 1. In other embodiments, the LiDAR sensor 100 may include four light sources and four detectors, or eight light sources and eight detectors. In one embodiment, the LiDAR sensor 100 may include eight light sources arranged as a 4×2 array and eight detectors arranged as a 4×2 array, so that the LiDAR sensor 100 may have a wider AFOV in the horizontal direction than its AFOV in the vertical direction. According to various embodiments, the total AFOV of the LiDAR sensor 100 may range from about 5 degrees to about 15 degrees, or from about 15 degrees to about 45 degrees, or from about 45 degrees to about 120 degrees, depending on the focal length of the emission lens, the scan range of each light source, and the number of light sources.

The light source 110a may be configured to emit light pulses in the ultraviolet, visible, or near infrared wavelength ranges. The energy of each light pulse may be in the order of microjoules, which is normally considered to be eye-safe for repetition rates in the KHz range. For light sources operating in wavelengths greater than about 1500 nm, the energy levels could be higher as the eye does not focus at those wavelengths. The detector 160a may comprise a silicon avalanche photodiode, a photomultiplier, a PIN diode, or other semiconductor sensors.

Figure 2A:
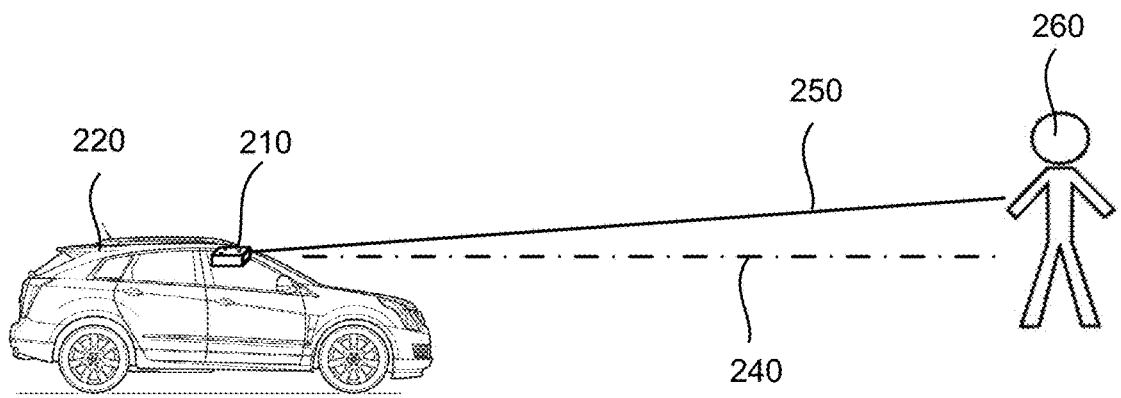
FIG. 2A shows schematically a LiDAR sensor mounted on a vehicle according to some embodiments.

When a LiDAR sensor, such as the LiDAR sensor 100 illustrated in FIG. 1, is used for obstacle detection for autonomous vehicles, the position and orientation of the LiDAR sensor with respect to the vehicle may need to be accurately known in order to accurately determine the location of an obstacle relative to the vehicle. FIG. 2A shows schematically a LiDAR sensor 210 mounted on a vehicle 220. For example, the LiDAR sensor 210 can be mounted at the top center behind the windshield of the vehicle 220. The LiDAR sensor 210 can be characterized by an optical axis 250 (e.g., the optical axis of an emission lens or a receiving lens). The vehicle 220 can have a longitudinal axis 240. It may be advantageous to align the optical axis 250 of the LiDAR sensor 210 with the longitudinal axis 240 of the vehicle 220, so that the LiDAR sensor 210 looks straight ahead toward the direction the vehicle 220 is heading.

Assume that the LiDAR sensor 210 is initially calibrated according to this alignment condition. If the LiDAR sensor's orientation is shifted (e.g., turned toward the left) due to some mechanical disturbances, then the optical axis 250 of the LiDAR sensor 210 is no longer aligned with the longitudinal axis 240 of the vehicle 220, as illustrated in FIG. 2A. The mis-alignment may result in inaccurate measurements of a position of an obstacle (e.g., a person 260) relative to the vehicle 220. Thus, re-calibration of the LiDAR sensor 210 may be required.

Figure 2B:
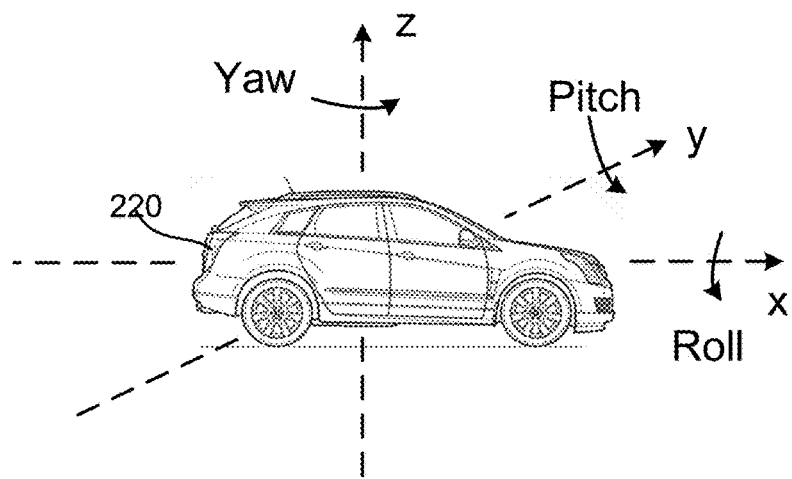
FIG. 2B illustrates a vehicle coordinate system according to some embodiments.

FIG. 2B illustrates a vehicle coordinate system. The vehicle coordinate system can have three degrees of translational freedom, which can be represented, for example, by the x, y, and z coordinates. The vehicle coordinate system can have three degrees of rotational freedom, which can be represented, for example, by the roll, pitch, and yaw angles about the x-axis, the y-axis, and the z-axis, respectively. For example, the x-axis can be along a longitudinal axis of the vehicle 220; the z-axis can be along the vertical direction; and the y-axis can be along the lateral direction. The position and the orientation of the LiDAR sensor 210 relative to the vehicle 220 can be characterized by the (x, y, z, roll, pitch, yaw) coordinates in the vehicle coordinate system.

Figure 2C:
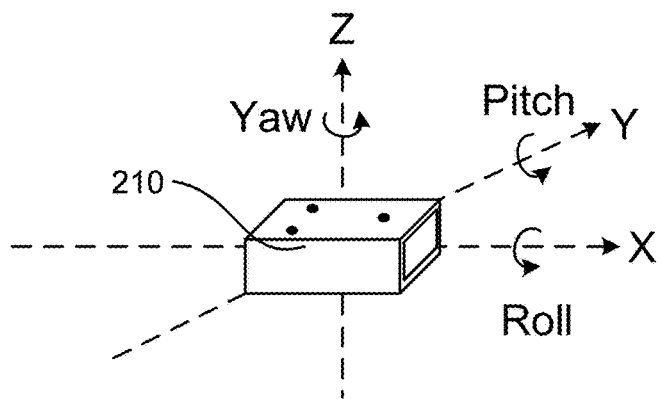
FIG. 2C illustrates a LiDAR coordinate system according to some embodiments.

FIG. 2C illustrates a LiDAR coordinate system. The LiDAR coordinate system can also have three degrees of translational freedom (e.g., represented by the X, Y, and Z coordinates) and three degrees of rotational freedom (e.g., represented by the roll, pitch, and yaw angles about the X-axis, the Y-axis, and the Z-axis, respectively). For example, the X-axis can be along an optical axis of the LiDAR sensor 210; the Z-axis can be along the nominal vertical direction; and the Y-axis can be along a direction orthogonal to the X-axis and the Z-axis.

The raw data of a point cloud acquired by the LiDAR sensor 210 can be in the LiDAR coordinate system. To determine the location of an obstacle relative to the vehicle 220, the point cloud data can be transformed into the vehicle coordinate system, if the position and the orientation of the LiDAR sensor 210 in the vehicle coordinate system is known. The transformation from the LiDAR coordinate system into the vehicle coordinate system may be referred herein as calibration of the LiDAR sensor 210 with respect to the vehicle 220.

According to some embodiments, the LiDAR sensor 220 can be mounted on the vehicle 220 so that the LiDAR sensor 210 is nominally aligned with respect to the vehicle 220. For example, the LiDAR sensor 210 can be mounted on the vehicle 220 such that the X-axis of the LiDAR coordinate system (e.g., along the optical axis of the LiDAR sensor 210) is nominally aligned with the x-axis of the vehicle coordinate system (e.g., along the longitudinal axis of the vehicle); the Y-axis of the LiDAR coordinate system is nominally aligned with the y-axis of the vehicle coordinate system; and the Z-axis of the LiDAR coordinate system is nominally aligned with the z-axis of the vehicle coordinate system. Thus, the roll angle, the pitch angle, and the yaw angle in the vehicle coordinate system are all approximately zero. A calibration may be required to compensate for any residual deviations from the nominal alignment to a sufficient accuracy. For example, it may be desirable to calibrate the LiDAR sensor 210 to a translational accuracy of 2 cm along each of the x-, y-, and z-axes, and a rotational accuracy of 0.1 degrees for each of the roll, pitch, and yaw angles.

Figure 3A:
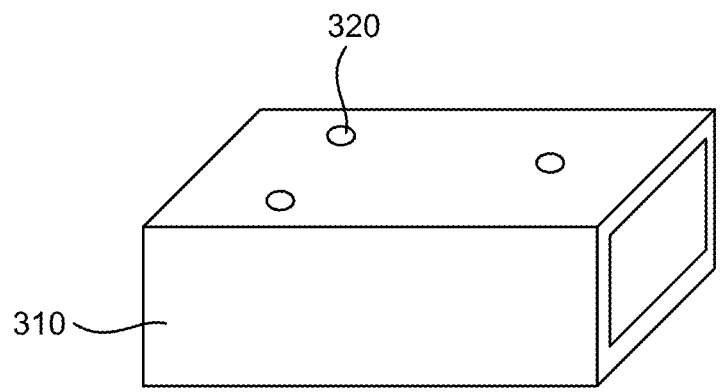
FIGS. 3A and 3B show schematically a mounting mechanism that can be used to mount a LiDAR sensor on a vehicle according to some embodiments.
Figure 3B:
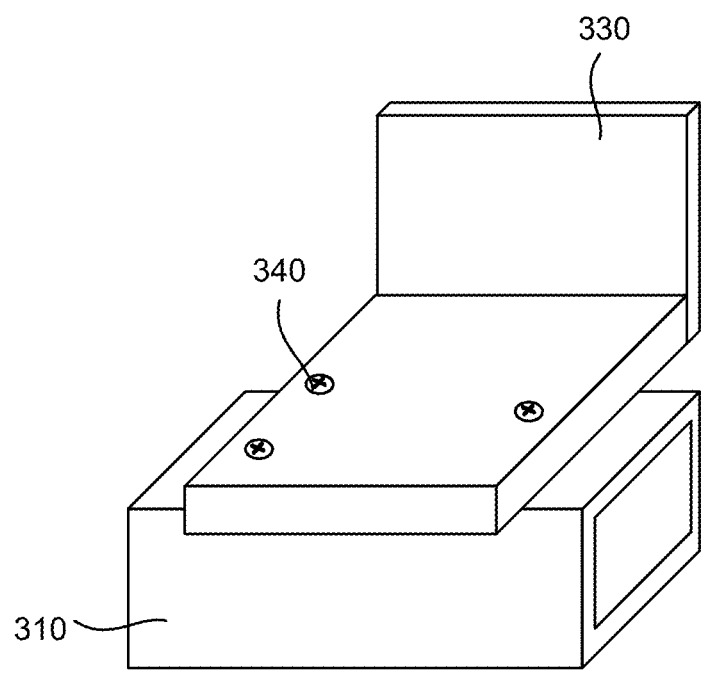

FIGS. 3A and 3B show schematically a mounting mechanism that can be used to mount a LiDAR sensor on a vehicle according to some embodiments. The LiDAR sensor can have an outer housing 310 with three mounting holes 320 (e.g., on the top surface of the outer housing 310), as illustrated in FIG. 3A. A bracket 330 can have three holes 340 that match with the mounting holes 320 on the outer housing 310, so that the LiDAR sensor can be attached to the bracket 330 with a fixed orientation, as illustrated in FIG. 3B. The bracket 330 can be attached to the vehicle (e.g., to the roof of the interior compartment), using similar mounting holes (not shown) for proper alignment.

A LiDAR sensor can be pre-calibrated in a manufacturer's plant to correct for any residual mis-alignment of the LiDAR sensor with respect to the vehicle. During the operation of the vehicle over time, the optical components of the LiDAR sensor can be shifted relative to the housing 310, or the housing 310 of the LiDAR sensor can be shifted relative to the mounting bracket 330 and/or to the vehicle. This may happen, for example, due to tear and wear of the internal mechanism of the LiDAR sensor, a collision or vibrations of the vehicle, mis-alignment of the tires, aging of the vehicle's suspension, and the like. Thus, over time, the calibration can become inaccurate and a new calibration may be required. According to various embodiments, LiDAR calibrations can be performed periodically using a target with an embedded mirror, or can be performed periodically or continuously using fixed features on the vehicle or fixed road features, as described in more detail below.

a. Calibration of Lidar Sensors Using a Target with an Embedded Mirror

Figure 4A:
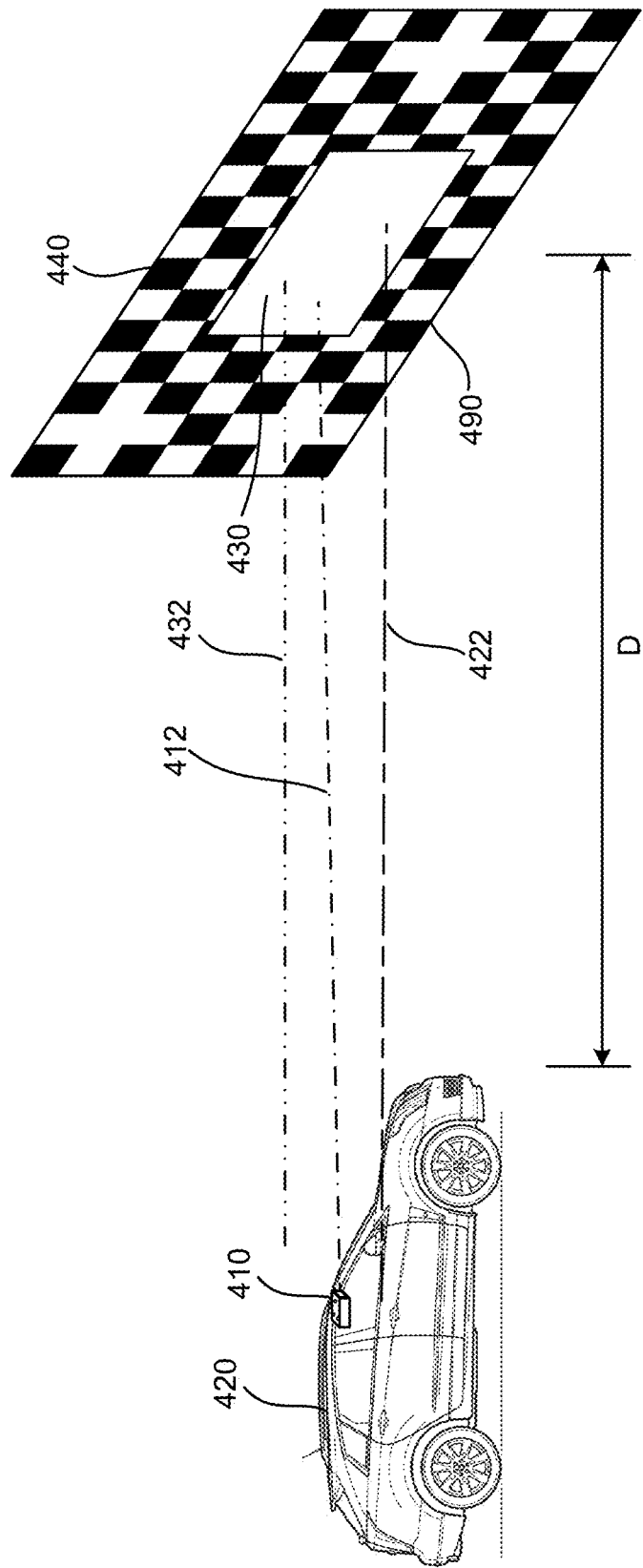
FIGS. 4A-4C illustrate an exemplary calibration setup for a LiDAR sensor mounted on a vehicle according to some embodiments.
Figure 4B:
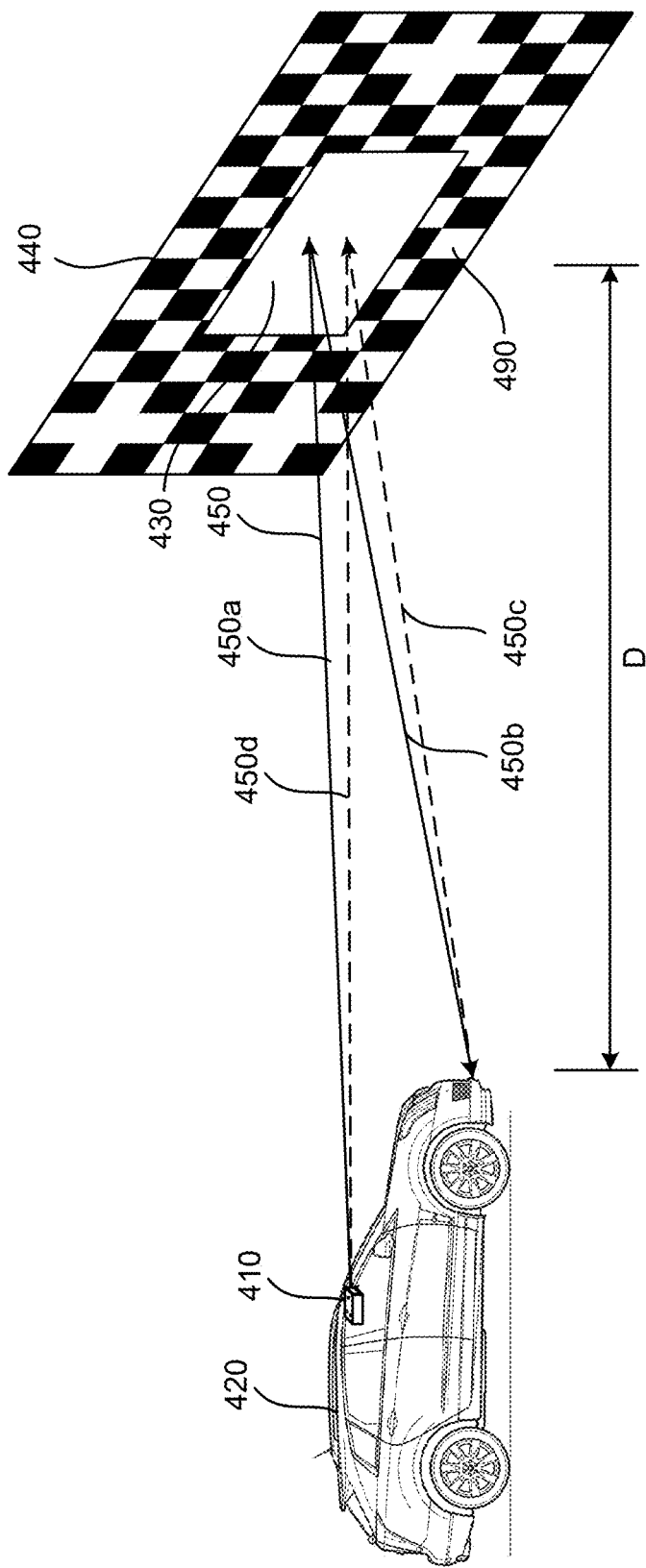
Figure 4C:
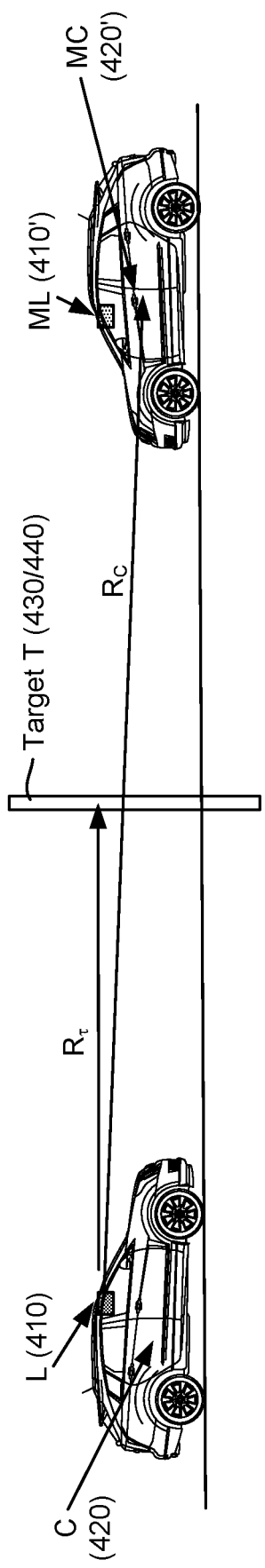

FIGS. 4A-4C illustrate an exemplary calibration setup for a LiDAR sensor mounted on a vehicle using a target with an embedded mirror according to some embodiments. The LiDAR sensor 410 is shown as mounted on behind the front windshield of the vehicle 420 in this example. This is however not required. For example, the LiDAR sensor 410 can be mounted on other locations on the vehicle 420, such as on the front bumper, the rear windshield, the rear bumper, and the like. A target 440 is placed at certain distance D in front of the LiDAR sensor 410. The target 440 includes a planar mirror 430 and identifiable features 490 surrounding the mirror 430.

Referring to FIG. 4A, the target 440 can be mounted on a stand (not shown), so that the mirror 430 is nominally vertical. Thus, an optical axis 432 of the mirror 430, which is normal to the surface of the mirror 430, can be nominally horizontal. The vehicle 420 is positioned and oriented relative to the mirror 430 so that an optical axis 412 of the LiDAR sensor is nominally parallel to the optical axis 432 of the mirror 430, and the target 440 is nominally centered at a field of view of the LiDAR sensor 410. In the cases in which the LiDAR sensor 410 is mounted behind the front windshield of the vehicle 420 (e.g., as illustrated in FIG. 4A), the vehicle 420 can be positioned so that a longitudinal axis 422 of the vehicle 420 is nominally parallel to the optical axis 432 of the mirror 430.

Referring to FIG. 4B, the LiDAR sensor 410 can acquire a three-dimensional image of the target 440 by scanning across the target 440. The three-dimensional image of the target can include images of the features 490 surrounding the mirror 430, and a mirror image of the vehicle 420 formed by the mirror 430. For example, the LiDAR sensor 410 can emit a laser pulse 450 (or 450a) directed toward the mirror 430. A reflected laser pulse 450b can be directed toward certain part of the vehicle (e.g., the license plate at the front bumper), which can in turn be reflected back toward the mirror 430 (indicated as 450c in FIG. 4B), and return back to LiDAR sensor 410 (indicated as 450d in FIG. 4B). Thus, the LiDAR sensor 410 can effectively acquire a three-dimensional mirror image of the vehicle 420, as illustrated in FIG. 4C.

According to some embodiments, the distance D between the target 440 and the vehicle 420 can be made large enough to meet desired accuracy. For example, the distance D can be about 3 m. The size of the mirror 430 can be made large enough so that the entire vehicle 420 is visible, although this is not required. For example, the size of the mirror 430 can be about 1 m tall and about 2 m wide. The size of the target 440 can be about 2 m tall and about 3 m wide (e.g., the edge of the target 440 with features 490 can have a 0.5 m width).

Figure 5A:
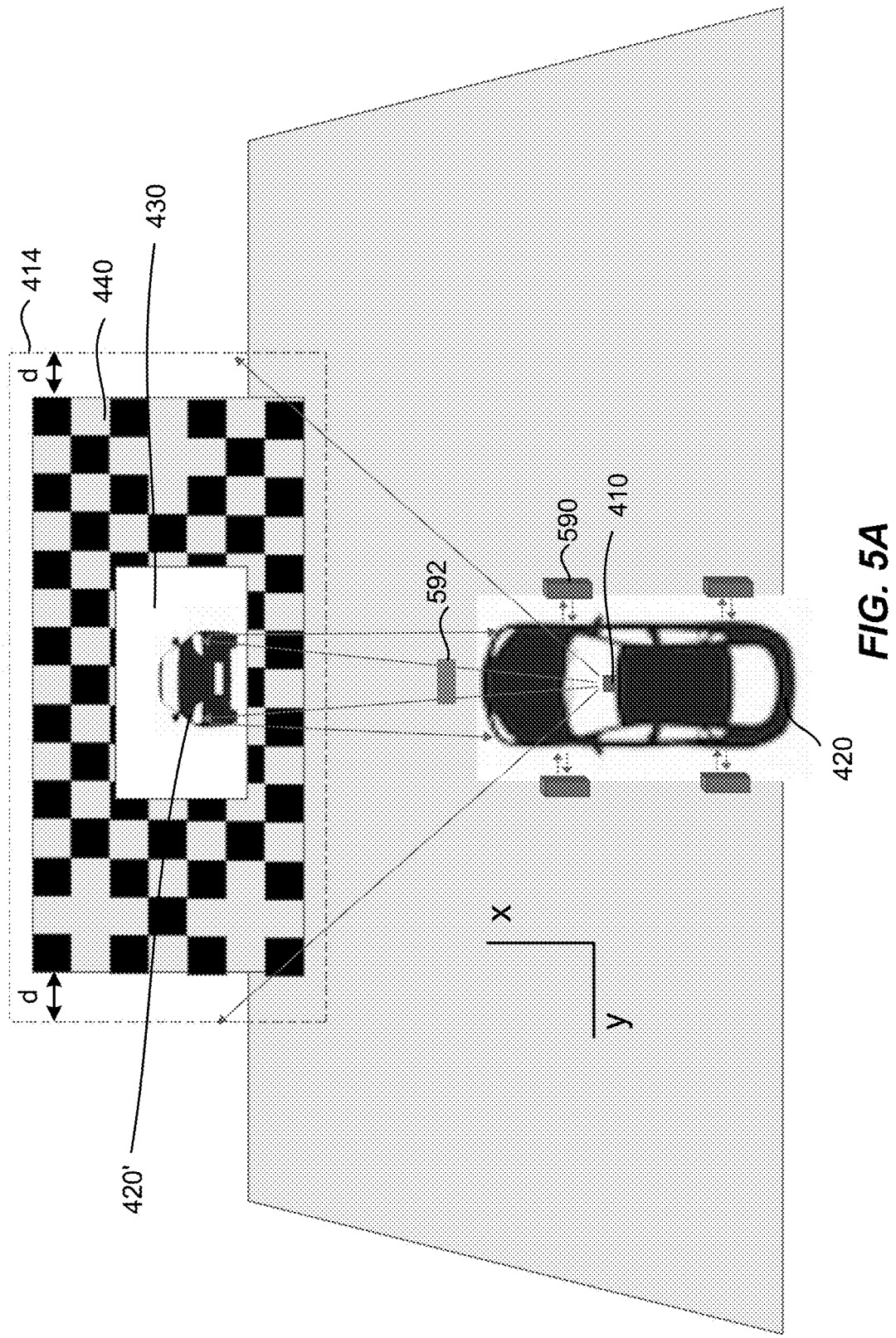
FIGS. 5A-5C and FIGS. 6A-6D illustrate schematically what a LiDAR sensor may see under various alignment conditions according to some embodiments.

FIG. 5A illustrates schematically what the LiDAR sensor 410 may see when the vehicle 420 is correctly aligned with respect to the target 440 (e.g., the longitudinal axis of the vehicle 420 is perpendicular to the surface of the mirror 430), and the LiDAR sensor 410 is correctly aligned with respect to the vehicle 420 (e.g., the optical axis of the LiDAR sensor 410 is parallel to the longitudinal axis of the vehicle 420). Assume also that the vehicle 420 is laterally centered with respect to the width of the mirror 430, and the LiDAR sensor 410 is laterally centered with respect to the vehicle 420. In such cases, the mirror image 420' of the vehicle 420 as seen from the LiDAR sensor 410 may appear symmetrical, and may not have any roll angle, pitch angle, or yaw angle. The target 440 may also appear symmetrical with respect to the LiDAR sensor's field of view 414 (e.g., the lateral margin d from the left edge of the target 440 to the left border of the field of view 414 is about the same as the lateral margin d from the right edge of the target 440 to the right border of the field of view 414), and may not have any roll angle, pitch angle, or yaw angle.

Figure 5B:
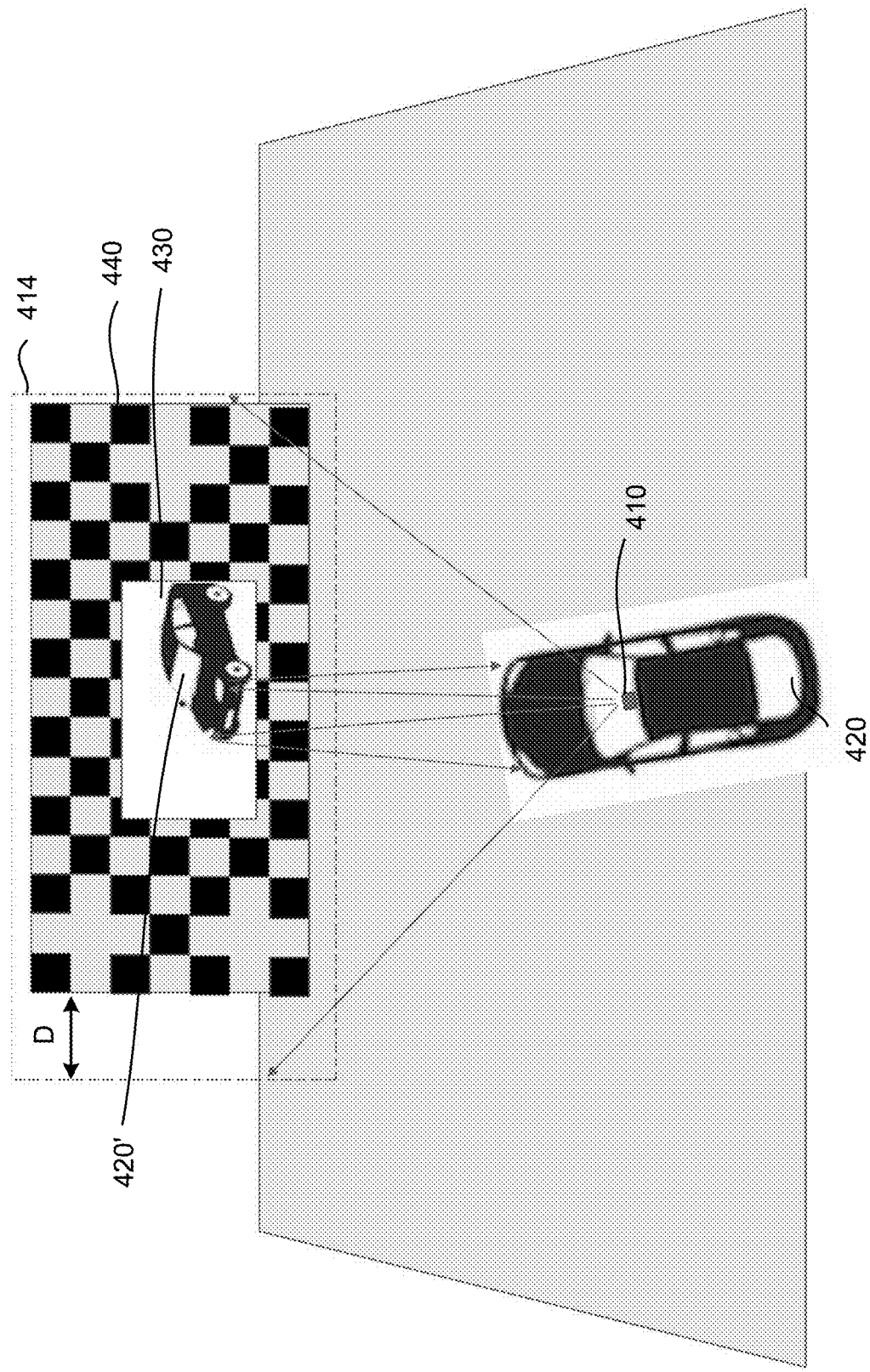

FIG. 5B illustrates schematically what the LiDAR sensor 410 may see when the LiDAR sensor 410 is correctly aligned with respect to the vehicle 420, but the vehicle 420 is misaligned with respect to the target 440 (e.g., the longitudinal axis of the vehicle 420 has a finite yaw angle with respect to the optical axis of the mirror 430). In such cases, the target 440 is no longer centered in the LiDAR's field of view 414 (e.g., laterally shifted toward the right). The amount of shift (e.g., the difference between the new margin D and the nominal margin d) can relate to the amount of mis-alignment. Thus, it may be possible to determine the amount of mis-orientation (e.g., the yaw error) of the vehicle 420 with respect to the target 440 based on the amount of shift. In addition, the mirror image 420' of the vehicle 420 as seen by the LiDAR sensor 410 also appears to have a finite yaw angle (note that the amount of the rotation is somewhat exaggerated in FIG. 5B). Thus, the LiDAR sensor 410 can also determine the amount of mis-orientation of the vehicle 420 with respect to the target 440 by measuring the distances of certain features of the vehicle 420. For example, as illustrated in FIG. 5B, the LiDAR sensor 410 can measure that one headlamp (e.g., the left headlamp) is farther from the LiDAR sensor 410 than the other headlamp (e.g., the right headlamp), and thus calculate the yaw angle of the vehicle 420.

Figure 5C:
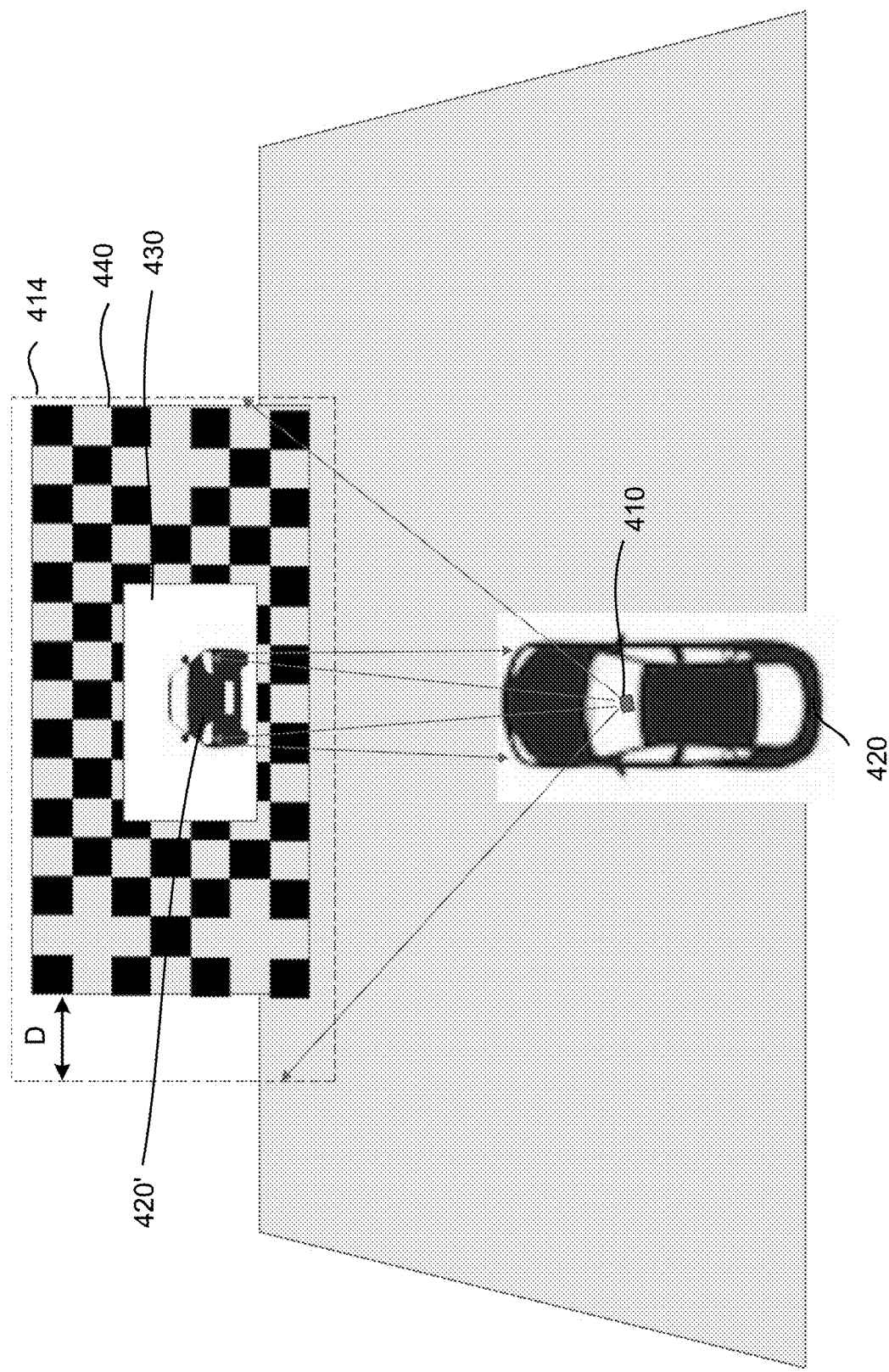

FIG. 5C illustrates schematically what the LiDAR sensor 410 may see when the vehicle 420 is correctly aligned with respect to the target 440 (e.g., the longitudinal axis of the vehicle 420 is perpendicular to the surface of the mirror 430), but the LiDAR sensor 410 is not properly aligned with respect to the vehicle 420 (e.g., the LiDAR sensor 410 looks to the left instead of looking straight ahead). In such cases, the mirror image 420' of the vehicle 420 may appear to be symmetric, but the target 440 may be laterally shifted (e.g., to the right) with respect to the LiDAR's field of view 414. The LiDAR sensor 410 can determine the amount of mis-orientation (e.g., the yaw error) of the LiDAR sensor 410 based on the amount of the shift (e.g., the difference between the new margin D and the nominal margin d).

Figure 6A:
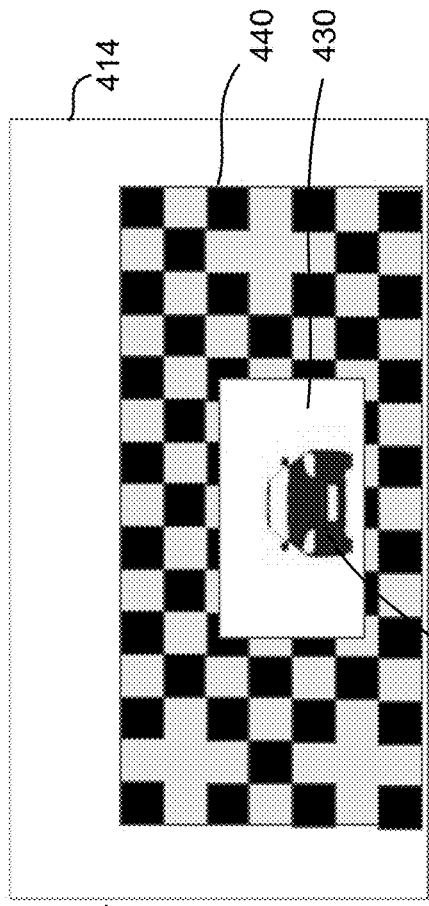

FIG. 6A illustrates schematically what the LiDAR sensor 410 may see when the LiDAR sensor 410 is correctly aligned with respect to the vehicle 420, but the vehicle 420 has a pitch error with respect to the target 440. In such cases, the target 440 is no longer centered in the LiDAR's field of view 414 (e.g., vertically shifted downward). The amount of vertical shift can relate to the amount of pitch error. Thus, it may be possible to determine the amount of pitch error of the vehicle 420 with respect to the target 440 based on the amount of vertical shift. In addition, the mirror image 420' of the vehicle 420 as seen by the LiDAR sensor 410 also appears to have a finite pitch angle (note that the amount of the rotation is somewhat exaggerated in FIG. 6A). Thus, the LiDAR sensor 410 can also determine the amount of pitch error of the vehicle 420 with respect to the target 440 by measuring the distances of certain features of the vehicle 420. For example, as illustrated in FIG. 6A, the LiDAR sensor 410 can measure that the roof of the vehicle 420 is tilted, and can calculate the pitch error based on the amount of tilt.

Figure 6B:
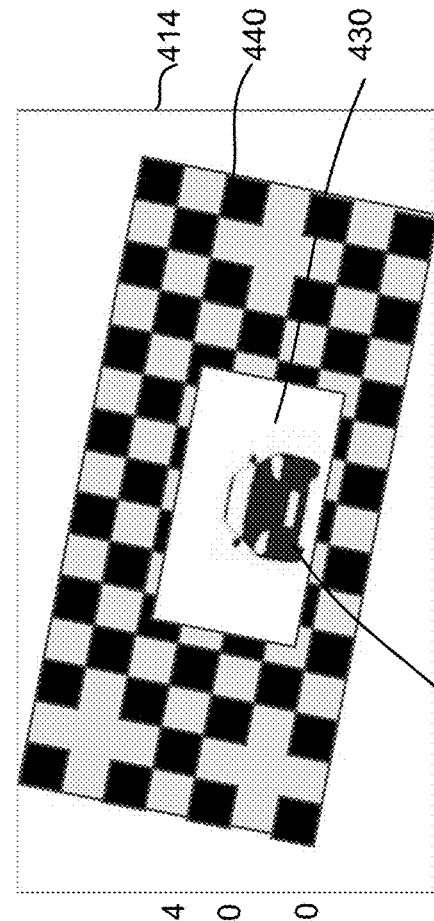

FIG. 6B illustrates schematically what the LiDAR sensor 410 may see when the vehicle 420 is correctly aligned with respect to the target 440, but the LiDAR sensor 410 has a pitch error with respect to the vehicle 420 (e.g., the LiDAR sensor 410 looks upward instead of looking straight ahead). In such cases, the mirror image 420' of the vehicle 420 may appear to have no pitch angle, but the target 440 may be vertically shifted (e.g., downward) with respect to the LiDAR's field of view 414. The LiDAR sensor 410 can determine the amount of pitch error of the LiDAR sensor 410 based on the amount of the vertical shift.

Figure 6C:
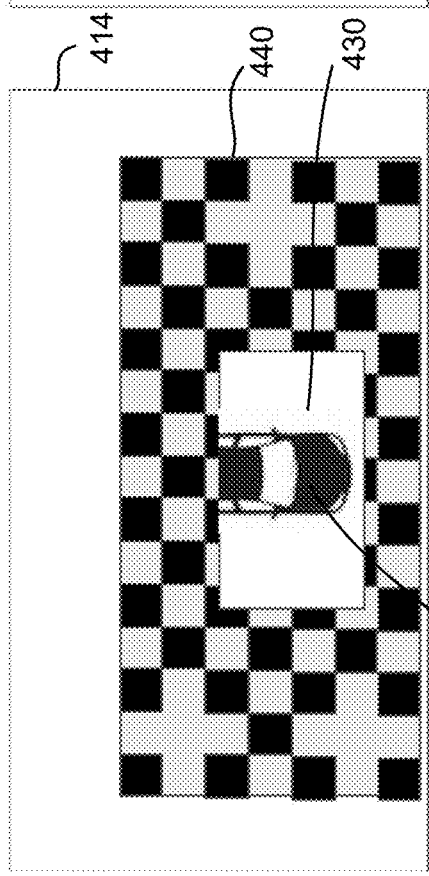

FIG. 6C illustrates schematically what the LiDAR sensor 410 may see when the LiDAR sensor 410 is correctly aligned with respect to the vehicle 420, but the vehicle 420 has a roll error with respect to the target 440. In such cases, the mirror image 420' of the vehicle 420 as seen by the LiDAR sensor 410 appears to have no roll angle, but the target 440 can appear to have a finite roll angle with respect to the LiDAR's field of view 414. It may be possible to determine the amount of roll error of the vehicle 420 with respect to the target 440 based on the amount of the roll angle of the target 440 with respect to the LiDAR sensor's field of view 414.

Figure 6D:
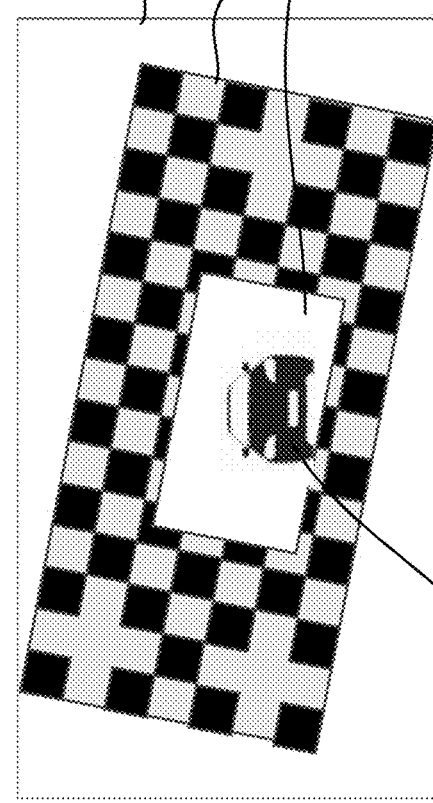

FIG. 6D illustrates schematically what the LiDAR sensor 410 may see when the vehicle 420 is correctly aligned with respect to the target 440, but the LiDAR sensor 410 has a roll error with respect to the vehicle 420. In such cases, both the mirror image 420' of the vehicle 420 and the target 440 may appear to have a finite roll angle with respect to the LiDAR's field of view 414. The LiDAR sensor 410 can determine the amount of roll error of the LiDAR sensor 410 based on the amount of the roll rotation.

Therefore, the LiDAR sensor 410 (or a computing unit of the vehicle 420) can determine a deviation from an expected alignment (e.g., an initial alignment performed in a manufacturer's plant) of the LiDAR sensor 410 with respect to the vehicle 420 by analyzing three-dimensional image acquired by the LiDAR sensor 410, which includes the images of the features 490 on the target and the mirror image 420' of the vehicle 420. The deviation from the expected alignment can include yaw error, roll error, pitch error, and translational errors (e.g., δx, δy, δz).

According to some embodiments, determining the deviation from the expected alignment of the LiDAR sensor 410 with respect to the vehicle 420 can include the following steps. A position and an orientation of the LiDAR sensor 410 relative to the target 440 can be determined based on the images of the features 490 on the target 440. A position and an orientation of the LiDAR sensor 410 relative to the mirror image 420' of the vehicle 420 can be determined based on the mirror image 420' of vehicle. Then, a transformation from a LiDAR coordinate system into a vehicle coordinate system can be determined based on: (i) the position and the orientation of the LiDAR sensor 410 relative to the target 440, and (ii) the position and the orientation of the LiDAR sensor 410 relative to the mirror image 420' of the vehicle 420.

In some embodiments, a computing unit can store a reference image. For example, the reference image can be an image acquired by the LiDAR sensor 410 just after an initial alignment has been performed at the manufacturer's plant, or can be a simulated image for the expected alignment. During re-calibration, the computing unit can compare the three-dimensional image acquired by the LiDAR sensor 410 to the reference image, and perform a multi-variable minimization (e.g., using a gradient descent or other algorithms) to determine a transformation matrix so that the acquired three-dimensional image most closely matches the reference image. The deviation from the expected alignment (e.g., yaw error, roll error, pitch error, δx, δy, and δz) can then be derived from the transformation matrix.

The following exemplary methods may be used to determine the relationship of the LiDAR sensor 410 to the vehicle 420, in as many as six degrees of freedom according to various embodiments. Other methods and techniques may also be used by those skilled in the arts. In the below descriptions of the exemplary embodiments, the following notations and terminologies will be used. $L_t$ denotes a matrix describing the relationship of the LiDAR sensor 410 to the target 440, $C_t$ denotes a matrix describing the relationship of the vehicle 420 to the target 440, $L_C$ denotes a matrix describing the relationship of the LiDAR sensor 410 to the vehicle 420 (for correcting any mis-calibration of the LiDAR sensor 410), M denotes a mirror transformation matrix, and $L_{mC}$ denotes a matrix describing the relationship of the LiDAR sensor 410 to the vehicle 420 as the LiDAR sensor 410 sees in the mirror 430.

In some embodiments, the LiDAR sensor 410 can establish its positional (x, y, z) relationship to the target features 490 around the mirror 430 by triangulating the distance from at least three target features 490 (e.g., similar to how a GPS receiver triangulates its position relative to the GPS satellites). The rotational relationships of pitch, roll, and yaw can be determined by measuring the location of at least three target features 490 (which could be the same target features used for x, y, and z). Thus, the matrix describing the relationship of the LiDAR sensor 410 to the target 440 $L_t$ can be established. The matrix $L_t$ is a 4×4 matrix that defines x, y, and z position, as well as pitch, roll, and yaw.

Next, the relationship of the vehicle 420 to the target 440 can be established by a similar procedure: by measuring the distance to certain features of the vehicle 420 as seen in the mirror 430 to triangulate its position relative to the target 440, and by measuring location of features on the vehicle 420 relative to the mirror 430 to determine the pitch, roll, and yaw of the vehicle 420. Thus, the matrix describing the relationship of the vehicle 420 to the target 440 $C_t$ can be established. The matrix $C_t$ is a 4×4 matrix that defines x, y, and z position, as well as pitch, roll, and yaw. The relationship of the LiDAR sensor 410 to the vehicle 420 can then be defined by $L_C = (C_t^{-1}) \cdot L_t$.

According to some embodiments, the LiDAR sensor 410 can determine its position relative to the target 440 as described above to establish the matrix $L_t$. The LiDAR sensor 410 can also determine the relationship of the mirror image of the vehicle 420' to the LiDAR sensor 410 as seen through the mirror 430 to establish the matrix $L_{mC}$. The relationship of the LiDAR sensor 410 to the vehicle 420 can then be determined by matrix multiplication as, $$L_C = L_t \cdot M(L_t^{-1}) L_{mC} \cdot M.$$

According to some embodiments, the image of the vehicle 420' as seen in the mirror 430 and the image of the target 440 as acquired by the LiDAR sensor 410 are compared to a stored reference image. The reference image can be either a simulated image or an image taken during factory calibration. A minimization technique (e.g., using a gradient descent algorithm) can then be used to determine the transform parameters (δx, δy, δz, pitch error, roll error, and yaw error) that minimizes the difference between the currently acquired image and the stored reference image. In this process, either the currently acquired image can be transformed to match the stored reference image, or the stored reference image can be transformed to match the currently acquired image. The transform parameters can represent the difference between the current LiDAR position and the ideal (or factory calibrated) LiDAR position relative to the vehicle 420.

Once the relationship of the LiDAR 410 to the vehicle 420 is determined, any discrepancy of this relationship from the current LiDAR calibration can be used to correct the LiDAR calibration.

In some embodiments, one or more distance sensors can be used to determine the location and the orientation of the vehicle 420 relative to the target 440 (e.g., in a world coordinate system). For example, by placing two or three distance sensors in the pavement under the vehicle 420, the pitch, roll, and z-coordinate (height) of the vehicle can be determined. By using six distance sensors, all degrees of freedom (x, y, z, pitch, roll, and yaw) can be determined. The distance sensors can be ultrasonic sensors or laser sensors.

An example of using distance sensors to determine the position and the orientation of the vehicle 420 is illustrated in FIG. 5A. In this example, four distance sensors 590 can be positioned in appropriate locations around the vehicle 420. For example, each distance sensor 590 can be located in the vicinity of a respective wheel of the vehicle 420. The distance sensor 590 can send an ultrasonic pulse or a laser pulse toward the wheel and measure the return pulse, thereby estimating the distance from the wheel. Thus, the y-coordinate and the yaw angle of the vehicle 420 can be determined. In some embodiments, only two distance sensors 590 on one side of the vehicle (either on the driver side or the passenger side) may be required. Another distance sensor 592 can be positioned in front the vehicle 420 to determine the x-coordinate of the vehicle 420.

According to some embodiments, additional corrections or calibrations can be made. For example, windshield distortion effects can be measured and corrected. Windshield distortion correction may be necessary every time the windshield is replaced.

Figure 7:
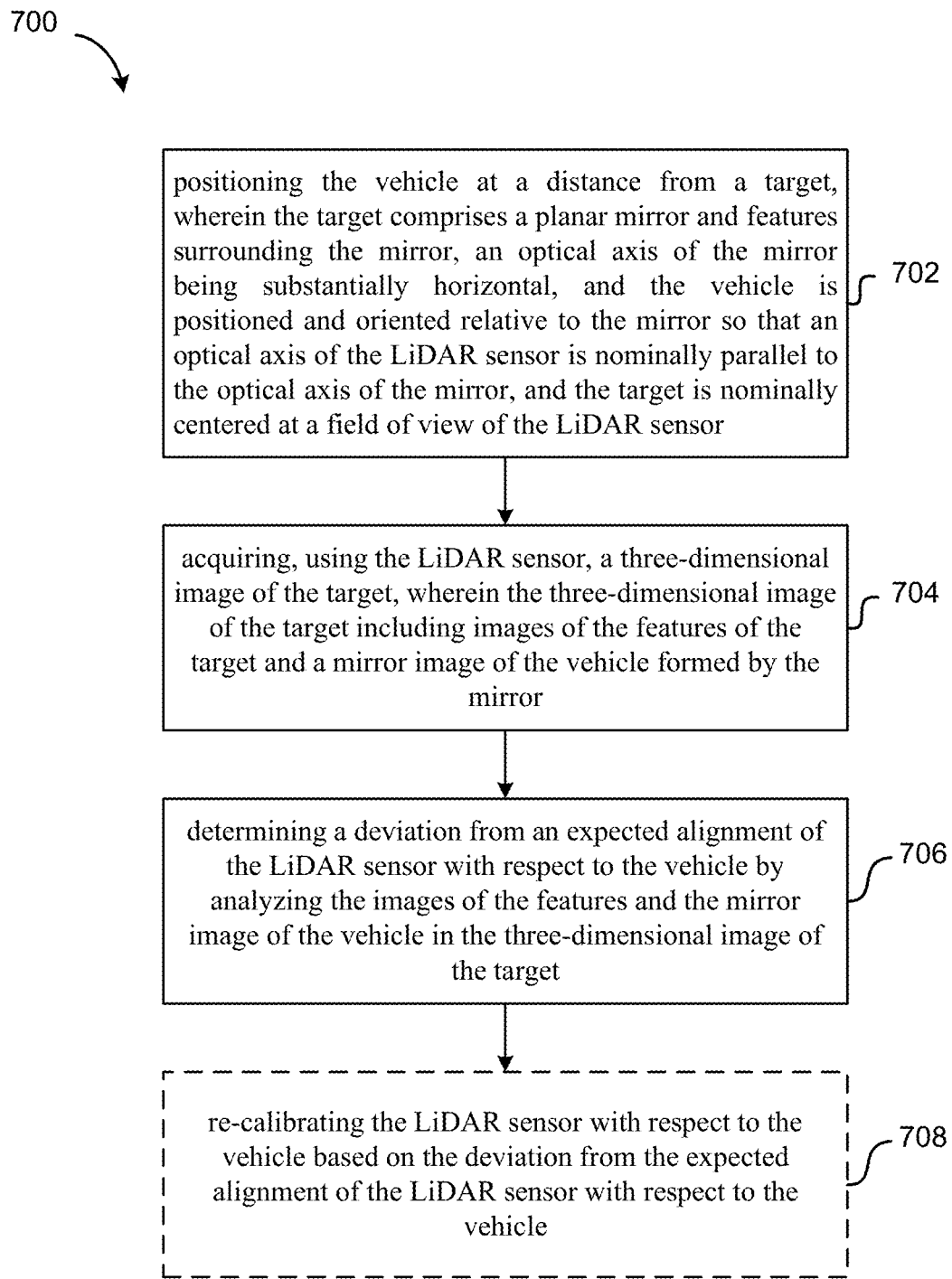
FIG. 7 shows a simplified flowchart illustrating a method of calibrating a LiDAR sensor mounted on a vehicle using a target with an embedded mirror according to some embodiments.

FIG. 7 shows a simplified flowchart illustrating a method 700 of calibrating a LiDAR sensor mounted on a vehicle using a target with an embedded mirror according to some embodiments.

The method 700 includes, at 702, positioning the vehicle at a distance from the target. The target includes a planar mirror and features surrounding the mirror. The optical axis of the mirror is substantially horizontal. The vehicle is positioned and oriented relative to the mirror so that an optical axis of the LiDAR sensor is nominally parallel to the optical axis of the mirror, and the target is nominally centered at a field of view of the LiDAR sensor.

The method 700 further includes, at 704, acquiring, using the LiDAR sensor, a three-dimensional image of the target. The three-dimensional image of the target includes images of the features of the target and a mirror image of the vehicle formed by the mirror.

The method 700 further includes, at 706, determining a deviation from an expected alignment of the LiDAR sensor with respect to the vehicle by analyzing the images of the features and the mirror image of the vehicle in the three-dimensional image of the target.

In some embodiments, the method 700 further includes, at 708, re-calibrating the LiDAR sensor with respect to the vehicle based on the deviation from the expected alignment of the LiDAR sensor with respect to the vehicle.

In some embodiments, the method 700 further includes determining that the deviation from the expected alignment of the LiDAR sensor exceeds a threshold, and providing an alert in response to determining that the deviation from the expected alignment of the LiDAR sensor exceeds the threshold.

In some embodiments, the field of view of the LiDAR sensor is less than 180 degrees in a horizontal direction.

In some embodiments, determining the deviation from the expected alignment of the LiDAR sensor with respect to the vehicle can include: determining a position and an orientation of the LiDAR sensor relative to the target based on the images of the features; determining a position and an orientation of the LiDAR sensor relative to the mirror image of the vehicle based on the mirror image of vehicle; and determining a transformation from a LiDAR coordinate system into a vehicle coordinate system based on: (i) the position and the orientation of the LiDAR sensor relative to the target, and (ii) the position and the orientation of the LiDAR sensor relative to the mirror image of the vehicle.

In some embodiments, determining the deviation from the expected alignment of the LiDAR sensor with respect to the vehicle can include: storing a reference matrix relating to an expected relationship between the LiDAR sensor and the vehicle; determining a matrix relating to a current relationship between the LiDAR sensor and the vehicle; and determining the deviation from the expected alignment of the LiDAR sensor with respect to the vehicle by comparing the matrix to the reference matrix. In some embodiments, the method 700 further includes re-calibrating the LiDAR sensor with respect to the vehicle based on the matrix relating to the current relationship between the LiDAR sensor and the vehicle.

It should be appreciated that the specific steps illustrated in FIG. 7 provide a particular method of calibrating a LiDAR sensor according to some embodiments. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

B. Dynamic Calibration of LiDAR Sensors Using Features on a Vehicle

It may be desirable to have a method of checking the calibration of a LiDAR sensor with respect to a vehicle periodically or continuously while the vehicle is parked or even during driving. According to some embodiments, calibration of the LiDAR sensor can be performed using features on the vehicle, so that calibration can be performed during normal operation of the vehicle. Such methods are referred to herein as dynamic calibration.

Figure 8:
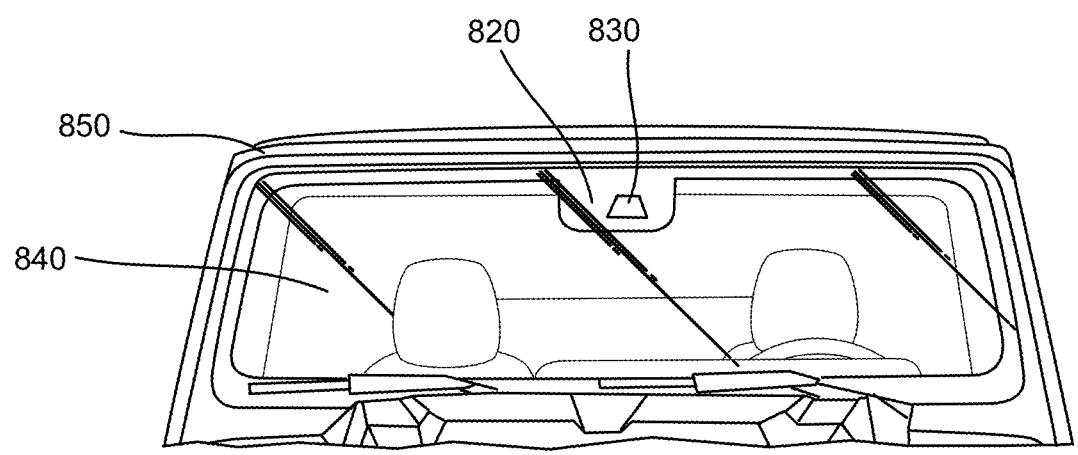
FIG. 8 illustrates a LiDAR sensor mounted behind the front windshield of the vehicle that includes a mask according to some embodiments.

FIG. 8 illustrates an example of dynamic calibration of a LiDAR sensor using a mask attached to a windshield according to some embodiments. As illustrated, the LiDAR sensor 810 (not visible in FIG. 8) is mounted behind the front windshield 840 of the vehicle 850. A mask 820 is attached to the windshield 840 in an area right in front of the LiDAR sensor 810. Assuming that the operating wavelength of the LiDAR sensor 810 is in the IR wavelength range, the mask 820 can be configured to block infrared (IR) light (e.g., optically opaque to infrared light). In some embodiments, the mask 820 can be in an annular shape surrounding an IR-transparent portion 830 of the windshield 840. The geometry and the size of the IR-blocking mask 820 can be made so that a perimeter around the edge of the field of view of the LiDAR sensor 810 is blocked.

Figure 9A:
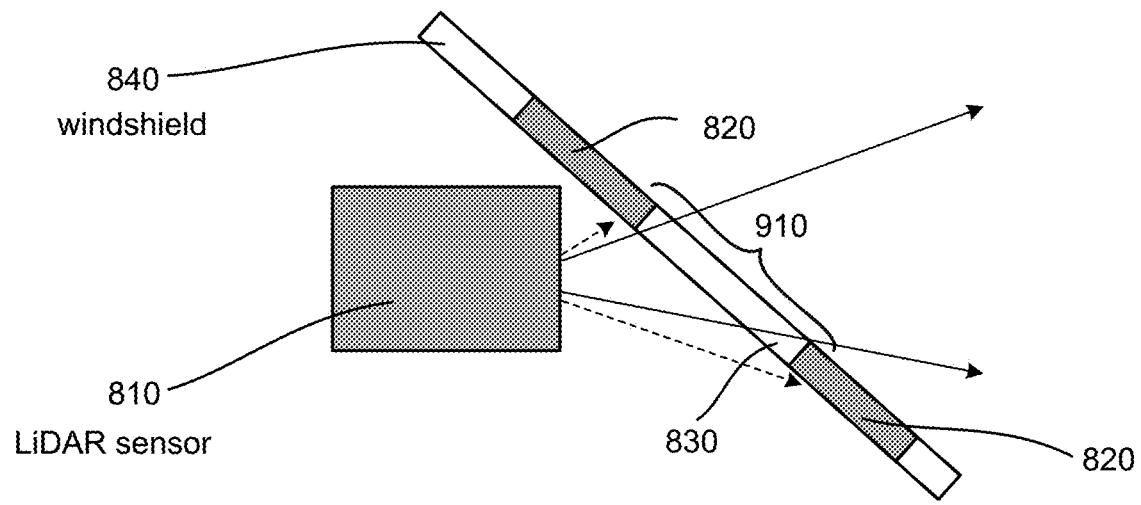
FIGS. 9A and 9B show schematically side views of the windshield with the mask illustrated in FIG. 8.
Figure 9B:
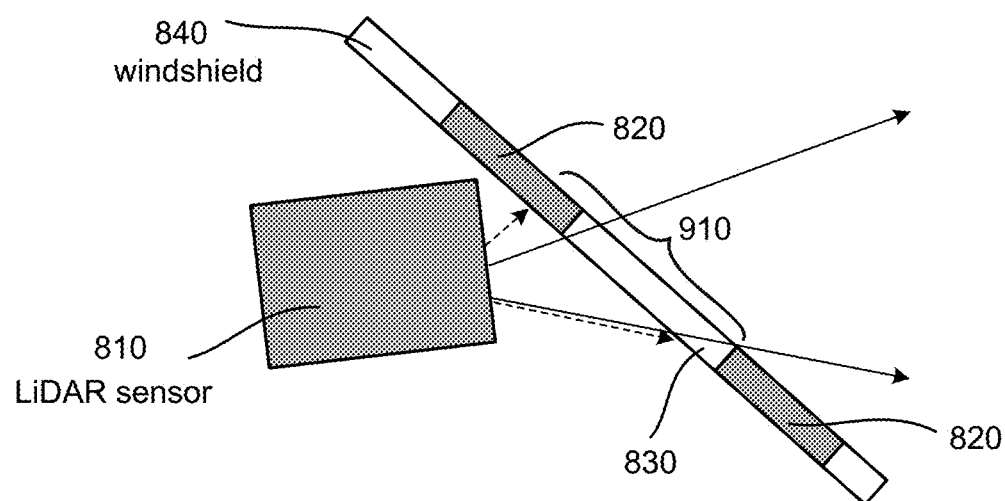

FIGS. 9A and 9B show schematically side views of the windshield 840 with the IR-blocking mask 820 according to some embodiments. The IR-transparent portion 830 of the windshield 840 is surrounded by the IR-blocking mask 820.

The IR-transparent portion 830 is slightly smaller than the field of view 910 of the LiDAR sensor 810. Referring to FIG. 9A, under a correct alignment (e.g., an expected alignment), the LiDAR sensor 810 can be positioned behind the windshield 840 so that its field of view 910 is centered about the IR-transparent portion 830. Thus, an edge of the field of view 910 is blocked on all four sides (the side view of FIG. 9A shows the upper and lower sides).

FIG. 9B shows an example when the LiDAR sensor 810 is shifted from the correct alignment position (e.g., tilted upward). As a result, the IR-transparent portion 830 is no longer centered about the field of view 830 of the LiDAR sensor 810. Thus, a larger portion of its field of view 910 can be blocked on the upper side than on the lower side.

Figure 10A:
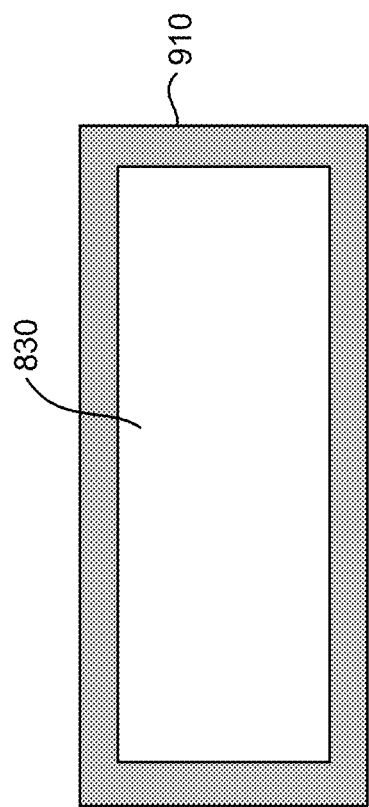
FIG. 10A-10C illustrate schematically some examples of effects of the mask illustrated in FIG. 8 on the effective field of view of the LiDAR sensor under various alignment conditions according to some embodiments.
Figure 10B:
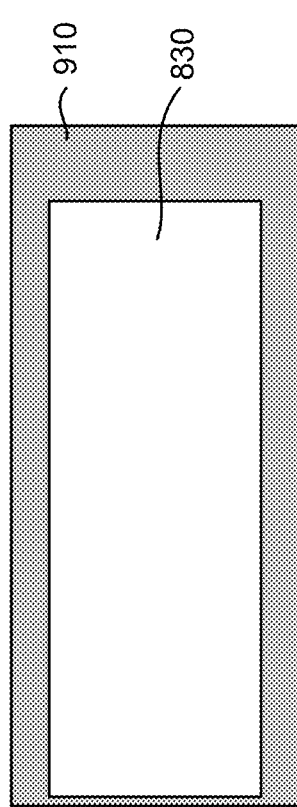
Figure 10C:
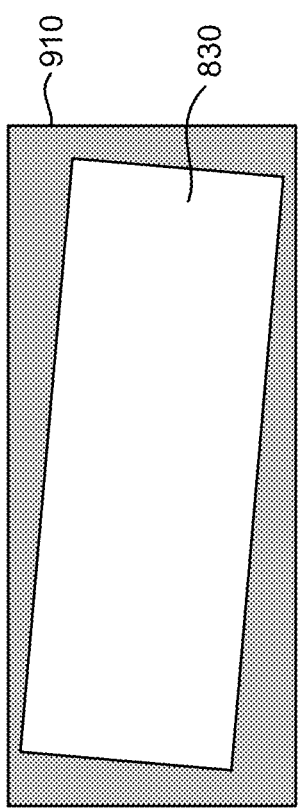

FIG. 10A-10C illustrate schematically some examples of effects of the IR-blocking mask 820 illustrated in FIG. 8 under various alignment conditions according to some embodiments. FIG. 10A illustrates an example in which the LiDAR sensor 810 is correctly aligned. The IR-transparent portion 830 of the windshield 840 is centered about the field of view 910 of the LiDAR sensor 810. Thus, the edge of the field of view 910 that is blocked by the IR-blocking mask 820 (the grey area) has the about the same width on all four sides.

FIG. 10B illustrates an example in which the LiDAR sensor 810 is shifted toward the right from the correct alignment position (e.g., the LiDAR sensor 810 has a yaw error). As a result, the IR-transparent portion 830 of the windshield 840 is shifted toward the left with respect to the field of view 910 of the LiDAR sensor 810. Thus, a larger portion of the field of view 910 is blocked by the IR-blocking mask 820 on the right side than on the left side.

FIG. 10C illustrates an example in which the LiDAR sensor 810 is rotated from the correct alignment position (e.g., the LiDAR sensor 810 has a roll error). As a result, the IR-transparent portion 830 of the windshield 840 is rotated with respect to the field of view 910 of the LiDAR sensor 810.

According to some embodiments, the relative position and orientation of the IR-transparent portion 830 of the windshield 840 with respect to the field of view 910 of the LiDAR sensor 810 can be used to calibrate the LiDAR sensor 810. For example, a computing unit can store a reference image. The reference can be either acquired by the LiDAR sensor 810 while the LiDAR sensor is in the correct alignment position, or can be obtained by simulation. For example, the reference image can be acquired by the LiDAR sensor just after the LiDAR sensor has been pre-calibrated in a manufacturing facility. When the LiDAR sensor 810 is in normal operation (either when the vehicle is parked or is driving), the computing unit can periodically or continuously compare a current LiDAR image with the reference image. Deviations from the correct alignment position of the LiDAR sensor 810 can be made based on the comparison.

In some embodiments, a multi-variable minimization can be performed to determine a transformation matrix so that the IR-transparent portion 830 of the windshield 840 in the current LiDAR image most closely matches that in the reference image. The deviations from the correct alignment position (e.g., yaw error, roll error, pitch error, ox, 6y, and 6z) can then be derived from the transformation matrix. According to various embodiments, the LiDAR sensor 810 can automatically re-calibrate itself, or provide an alert the vehicle in response to determining that the deviation from the correct alignment position exceeds a threshold.

Figure 10D:
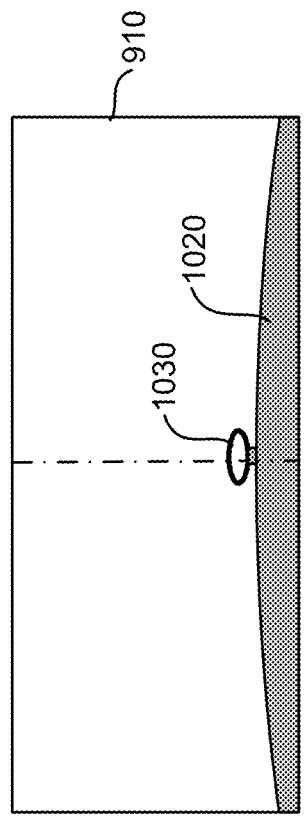
FIGS. 10D-10F illustrate schematically some exemplary images of certain features of the vehicle acquired by the LiDAR sensor according to some embodiments.
Figure 10E:
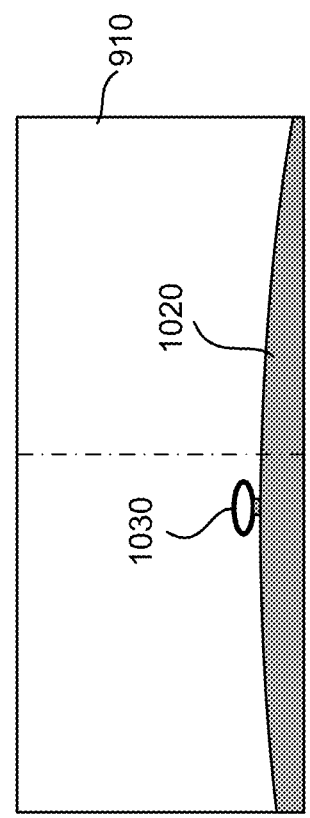
Figure 10F:
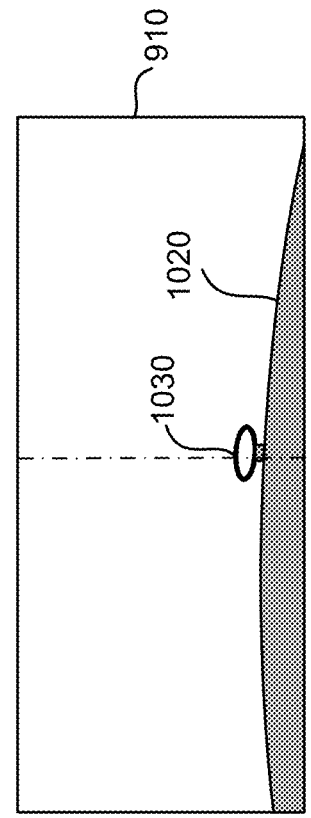

Additionally or alternatively, images of some fixed features on the vehicle acquired by the LiDAR sensor 810 can also be used to calibrate the LiDAR sensor 810. FIGS. 10D-10F illustrate some exemplary images that can be acquired by the LiDAR sensor 810. The images show part of the hood 1020 of the vehicle and an ornamental feature 1030 (e.g., a manufacturer's logo) attached to the hood 1020. In FIG. 10D, the ornamental feature 1030 is approximately laterally centered in the field of view 910 of the LiDAR sensor 810. In FIG. 10E, the ornamental feature 1030 is shifted to the left of the field of view 910, indicating that the LiDAR sensor 810 can be turned toward the right (e.g., has a yaw error). In FIG. 10F, the ornamental feature 1030 is rotated, indicating that the LiDAR sensor 810 can be rotated (e.g., has a roll error). Note that images of the hood 1020 in FIGS. 10E and 10F are also shifted and/or rotated accordingly. Other exemplary features of the vehicle that can be used for calibration include a cover over a LiDAR sensor mounted in the grill, features in a headlamp or tail lamp (e.g, if the LiDAR sensor is installed inside the headlamp or tail lamp), and the like.

According to some embodiments, a computing unit can store a reference image acquired by the LiDAR sensor while the LiDAR sensor is in a correct alignment (e.g., an expected alignment) with respect to the vehicle. The reference image can include a first image of a fixed feature on the vehicle. When the LiDAR sensor 810 is in normal operation (either when the vehicle is parked or is driving), the computing unit can periodically or continuously compare a current LiDAR image with the reference image. The current LiDAR image includes a second image of the fixed feature of the vehicle. Deviations from the correct alignment can be determined by comparing the position and orientation of the fixed feature in the second image to those in the first image.

Figure 11:
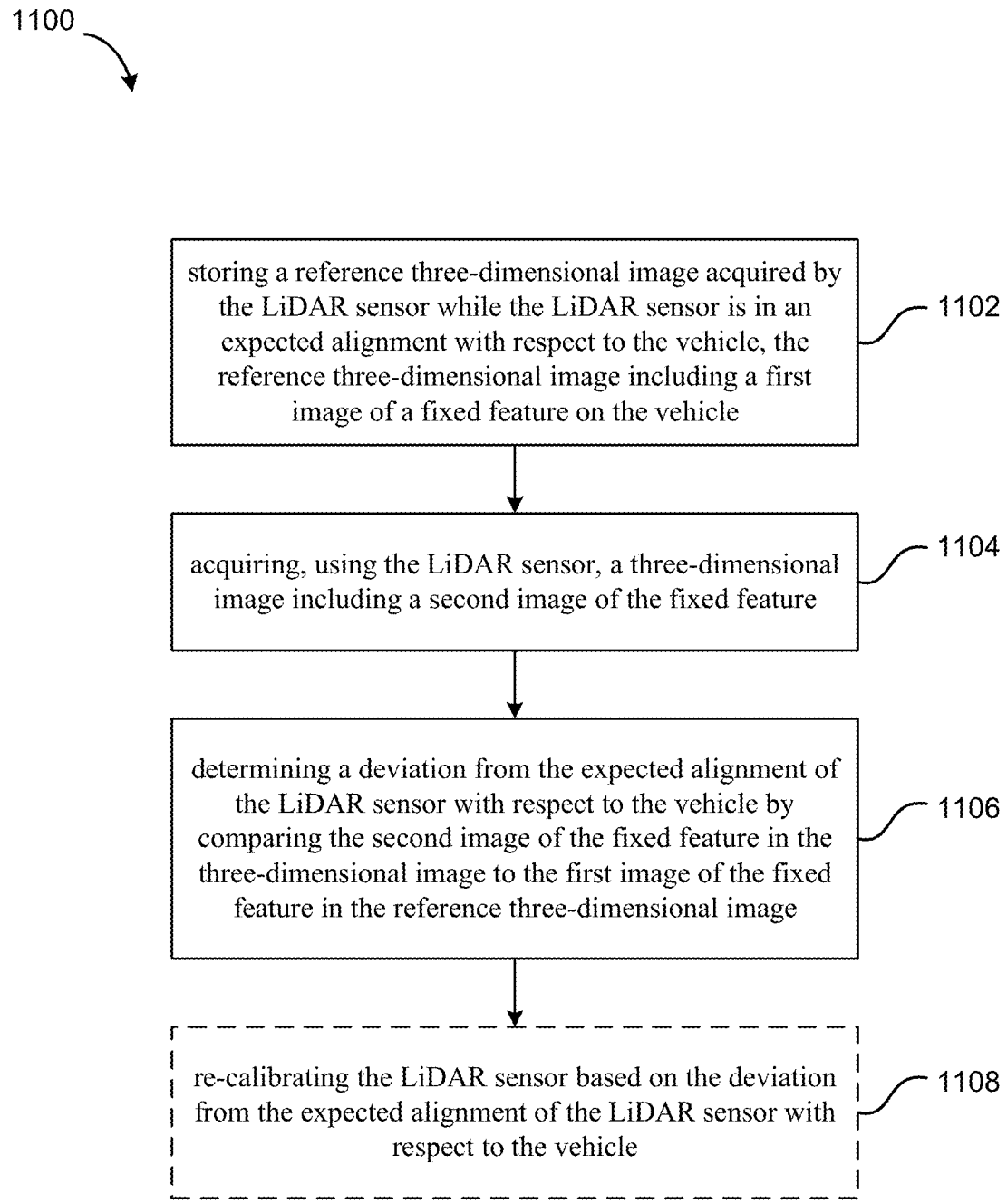
FIG. 11 shows a simplified flowchart illustrating a method of calibrating a LiDAR sensor mounted on a vehicle using features on the vehicle according to some embodiments.

FIG. 11 shows a simplified flowchart illustrating a method 1100 of calibrating a LiDAR sensor mounted on a vehicle using features on the vehicle according to some embodiments.

The method 1100 includes, at 1102, storing a reference three-dimensional image acquired by the LiDAR sensor while the LiDAR sensor is in an expected alignment with respect to the vehicle. The reference three-dimensional image includes a first image of a fixed feature on the vehicle.

The method 1100 further includes, at 1104, acquiring, using the LiDAR sensor, a three-dimensional image including a second image of the fixed feature.

The method 1100 further includes, at 1106, determining a deviation from the expected alignment of the LiDAR sensor with respect to the vehicle by comparing the second image of the fixed feature in the three-dimensional image to the first image of the fixed feature in the reference three-dimensional image.

In some embodiments, the method 1100 further includes, at 1108, re-calibrating the LiDAR sensor based on the deviation from the expected alignment of the LiDAR sensor with respect to the vehicle.

In some embodiments, the method 1100 further includes determining a transformation to be applied to the second image of the fixed feature in the three-dimensional image so as to match the first image of the fixed feature in the reference three-dimensional image, and re-calibrating the LiDAR sensor based on the transformation.

In some embodiments, the method 1100 further includes determining that the deviation from the expected alignment of the LiDAR sensor exceeds a threshold, and providing an alert in response to determining that the deviation from the expected alignment of the LiDAR sensor exceeds the threshold.

In some embodiments, the reference three-dimensional image is acquired by the LiDAR sensor after the LiDAR sensor has been pre-calibrated in a manufacturing facility.

In some embodiments, the fixed feature includes a portion of a hood of the vehicle or an object attached to the hood.

In some embodiments, the LiDAR sensor is positioned behind a windshield of the vehicle, and the fixed feature includes a mask attached to an area of the windshield that is directly in front of the LiDAR sensor. The mask is configured to block light in an operating wavelength of the LiDAR sensor, and is shaped to block a portion of a field of view of the LiDAR sensor. The mask can have an outer boundary and an inner boundary, and the inner boundary is sized so that the mask encroaches a perimeter of the field of view of the LiDAR sensor.

It should be appreciated that the specific steps illustrated in FIG. 11 provide a particular method of calibrating a LiDAR sensor according to some embodiments. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

C. Dynamic Calibration of LiDAR Sensors Using Road Features

According to some embodiments, a method of dynamic calibration of a LiDAR sensor mounted on a vehicle can use road features as the vehicle travels in a relatively straight section of a road. FIGS. 12A and 12B illustrate an example. A LiDAR sensor 1210 is shown as mounted behind the front windshield of a vehicle 1220 (the LiDAR sensor 1210 can be mounted in other positions, e.g., on the front bumper). The vehicle 1220 is traveling on a straight section of a road 1230. The painted lane markings 1240 can be used for dynamically calibrating the position and orientation of the LiDAR sensor 1210 relative to the vehicle 1220 based on LiDAR images acquired while the vehicle is traveling along the road 1230. Using the painted lane markings for calibration can be advantageous, as they exist almost on all roads. Also, the distance between a pair of lane markings 1240 is usually a standard distance. The lane markings with retroreflective paint may show up clearly in LiDAR images.

As illustrated in FIG. 12A, if the LiDAR sensor 1210 is properly aligned with respect to the vehicle 1220 (e.g., the LiDAR sensor 1210 is looking in the same direction as the vehicle 1220 is heading), the pair of lane markings 1240 may appear to pass equally on each side of the vehicle path 1250. As illustrated in FIG. 12B, if the LiDAR sensor 1210 is mis-aligned with respect to the vehicle 1220 (e.g., the LiDAR sensor 1210 is looking to the left with respect to the longitudinal axis of the vehicle 1220), then the pair of lane markings 1240 may appear to pass the vehicle 1220 asymmetrically with respect to the vehicle path 1250. For example, the vehicle path 1250 can appear as moving closer to the lane marking 1240a on the driver side than to the lane marking 1240b on the passenger side. Thus, by analyzing the LiDAR images of the lane markings 1240 with respect to the vehicle path 1250, the amount of mis-alignment (e.g., the yaw error) of the LiDAR sensor 1210 with respect to the vehicle 1220 can be estimated.

FIGS. 13A-13C illustrate some more examples of using lane makings for dynamic calibration of a LiDAR sensor mounted on a vehicle according to some embodiments. As illustrated in FIG. 13A, if the alignment of the LiDAR sensor 1210 has a pitch error, the lane markings 1240 may appear to be tilted with respect to the vehicle path (assuming that the road is relatively level).

As illustrated in FIG. 13B, if the alignment of the LiDAR sensor 1210 has a roll error, the lane marking 1240a on one side of the vehicle 1220 (e.g., the driver side) may appear to be higher than the lane marking 1240b on the other side of the vehicle 1220 (e.g., the passenger side).

As illustrated in FIG. 13C, if the alignment of the LiDAR sensor 1210 has a Z error (in the vertical direction), the height of the lane markings 1240 may be offset from the vehicle path. Translational errors in the other two orthogonal directions (e.g., X error and Y error) can also be detected by monitoring the motions of objects such as lane markings (vs. expected motions) as the vehicle 1220 travels forward.

Thus, by analyzing the spatial relationship between the images of the lane markings 1240 (or other road features) and the vehicle path, various rotational and translational mis-alignments of the LiDAR sensor 1210 with respect to the vehicle 1220 can be detected and estimated. If a LiDAR sensor is mounted on the side or the rear of the vehicle, similar calibration procedures can be used, with appropriate modification and mathematical transformations to account for the different view angles.

According to some embodiments, measurements can be repeated a number of times, and the results can be averaged to account for, for example, roadway irregularities, poorly painted lane markings, curves, dips, potholes, and the like. Outliers can be discarded. Outliers can result from, for example, lane changes and other driving irregularities, obstruction of view of the lane markings by other vehicles, and the like.

According to some embodiments, other information can be used to augment the quality and reliability of the calibration data. For example, data from the vehicle steering sensor, global navigation satellite systems (e.g., GPS) data, and inertial measurement unit (IMU) data, and the like, can be used to make sure the vehicle is not turning. Map data can be used to select good road sections for calibration, where the road is straight, level, and the lane markings are fresh and properly spaced. Other road features such as curbs, guardrails, and road signs may also be used as input to the calibration algorithm.

Figure 14:
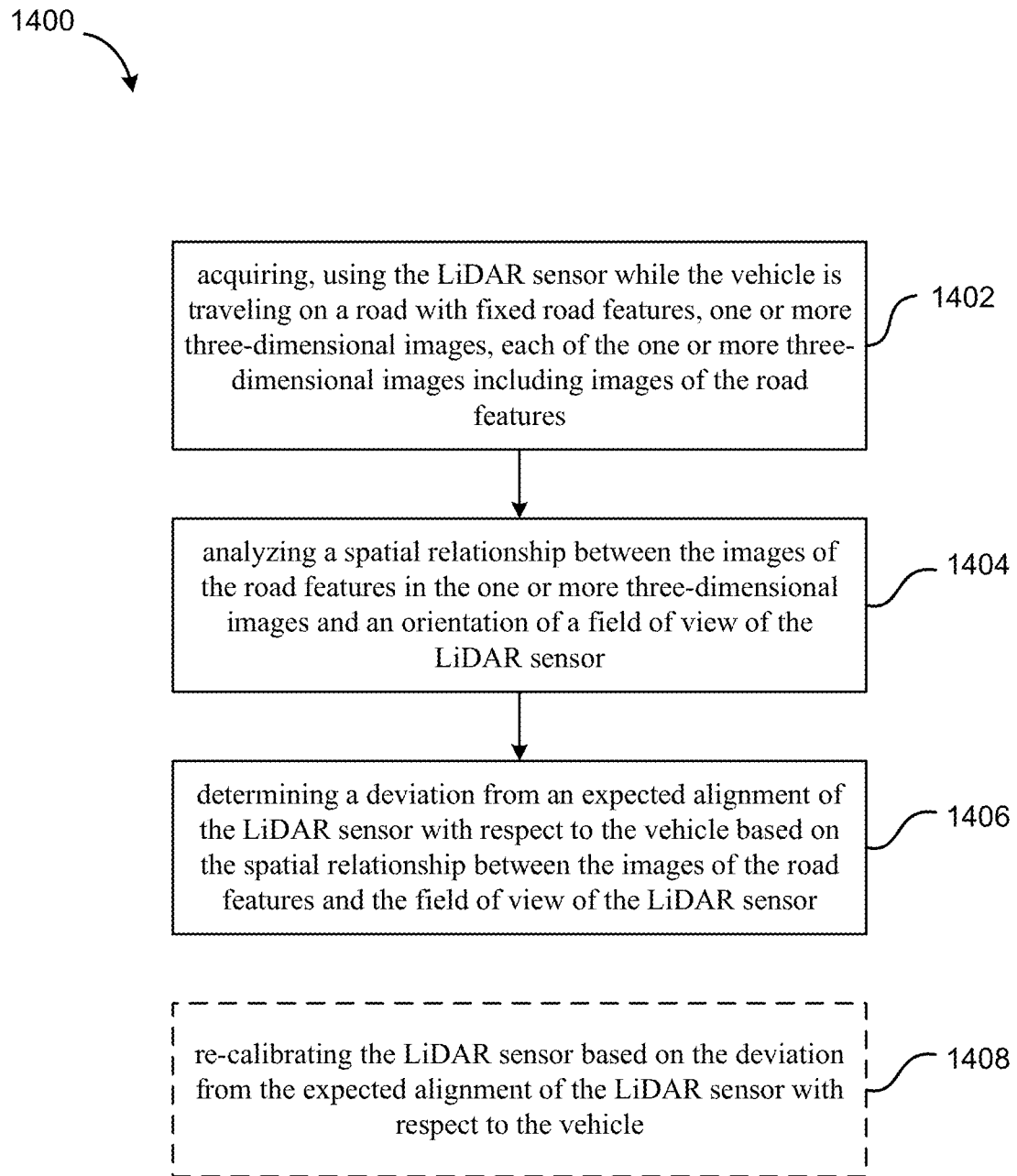
FIG. 14 shows a simplified flowchart illustrating a method of calibrating a LiDAR sensor mounted on a vehicle using road features according to some embodiments.

FIG. 14 shows a simplified flowchart illustrating a method 1400 of calibrating a LiDAR sensor mounted on a vehicle using road features according to some embodiments.

The method 1400 includes, at 1402, acquiring, using the LiDAR sensor while the vehicle is traveling on a road with fixed road features, one or more three-dimensional images. Each of the one or more three-dimensional images includes images of the road features.

The method 1400 further includes, at 1404, analyzing a spatial relationship between the images of the road features in the one or more three-dimensional images and an orientation of a field of view of the LiDAR sensor.

The method 1400 further includes, at 1406, determining a deviation from an expected alignment of the LiDAR sensor with respect to the vehicle based on the spatial relationship between the images of the road features and the field of view of the LiDAR sensor.

In some embodiments, the method 1400 further includes, at 1408, re-calibrating the LiDAR sensor based on the deviation from the expected alignment of the LiDAR sensor with respect to the vehicle.

In some embodiments, the method 1400 further includes determining that the deviation from the expected alignment of the LiDAR sensor exceeds a threshold, and providing an alert in response to determining that the deviation from the expected alignment of the LiDAR sensor exceeds the threshold.

In some embodiments, the road features include one or more pairs of lane markings on either side of the vehicle. Analyzing the spatial relationship can include determining a pitch angle between one pair of lane markings of the one or more pairs of lane markings and the field of view of the LiDAR sensor; and determining the deviation from the expected alignment of the LiDAR sensor can include determining a pitch error of the LiDAR sensor based on the pitch angle. In some embodiments, the one or more pairs of lane markings can include a first lane marking on a driver side of the vehicle and a second lane marking on a passenger side of the vehicle; analyzing the spatial relationship can include determining a height difference between the first lane marking and the second lane marking; and determining the deviation from the expected alignment of the LiDAR sensor can include determining a roll error of the LiDAR sensor based on the height difference.

In some embodiments, the one or more three-dimensional images can include a plurality of three-dimensional images acquired by the LiDAR sensor over an interval of time as the vehicle is traveling on the road for an interval of distance. The road can be substantially straight and level over the interval of distance. In some embodiments, the method 1400 further includes determining a path of the vehicle over the interval of distance, and comparing the path of the vehicle to paths of the road features from the plurality of three-dimensional images. In some embodiments, the one or more pairs of lane markings include a first lane marking on a driver side of the vehicle and a second lane marking on a passenger side of the vehicle; analyzing the spatial relationship can include determining an amount of lateral asymmetry between the first lane marking from the path of the vehicle and the second lane marking from the path of the vehicle; and determining the deviation from the expected alignment of the LiDAR sensor can include determining a yaw error of the LiDAR sensor based on the amount of lateral asymmetry. In some embodiments, analyzing the spatial relationship can include determining a height difference between one pair of lane markings and the path of the vehicle; and determining the deviation from the expected alignment of the LiDAR sensor can include determining a vertical error of the LiDAR sensor based on the height difference.

It should be appreciated that the specific steps illustrated in FIG. 14 provide a particular method of calibrating a LiDAR sensor according to some embodiments. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of calibrating a LiDAR sensor mounted on a vehicle, the method comprising:
  storing a reference three-dimensional image acquired by the LiDAR sensor while the LiDAR sensor is in an expected alignment with respect to the vehicle, the reference three-dimensional image including a first image of a fixed feature on the vehicle, wherein:
    the LiDAR sensor is positioned behind a windshield of the vehicle; and
    the fixed feature comprises a mask attached to an area of the windshield that is directly in front of the LiDAR sensor, wherein the mask is configured to block light in an operating wavelength of the LiDAR sensor and is shaped to block a portion of a field of view of the LiDAR sensor;
  acquiring, using the LiDAR sensor, a three-dimensional image including a second image of the fixed feature; and
  determining a deviation from the expected alignment of the LiDAR sensor with respect to the vehicle by comparing the second image of the fixed feature in the three-dimensional image to the first image of the fixed feature in the reference three-dimensional image.

2. The method of claim 1, further comprising:
  re-calibrating the LiDAR sensor based on the deviation from the expected alignment of the LiDAR sensor with respect to the vehicle.

3. The method of claim 1, further comprising:
  determining a transformation to be applied to the second image of the fixed feature in the three-dimensional image so as to match the first image of the fixed feature in the reference three-dimensional image; and
  re-calibrating the LiDAR sensor based on the transformation.

4. The method of claim 1, further comprising:
  determining that the deviation from the expected alignment of the LiDAR sensor exceeds a threshold; and
  providing an alert in response to determining that the deviation from the expected alignment of the LiDAR sensor exceeds the threshold.

5. The method of claim 1, wherein the reference three-dimensional image is acquired by the LiDAR sensor after the LiDAR sensor has been pre-calibrated in a manufacturing facility.

6. The method of claim 1, wherein the deviation from the expected alignment of the LiDAR sensor includes one or more of a yaw deviation, a roll deviation, a pitch deviation, and translational deviations along three orthogonal axes.

7. The method of claim 1, wherein the fixed feature comprises a portion of a hood of the vehicle or an object attached to the hood.

8. The method of claim 1, wherein the mask has an outer boundary and an inner boundary, the inner boundary being sized so that the mask encroaches a perimeter of the field of view of the LiDAR sensor.

9. The method of claim 1, further comprising:
  acquiring, using the LiDAR sensor while the vehicle is traveling on a road with fixed road features, one or more three-dimensional images, each of the one or more three-dimensional images including images of the fixed road features;

analyzing a spatial relationship between the images of the fixed road features in the one or more three-dimensional images and an orientation of a field of view of the LiDAR sensor; and determining the deviation from the expected alignment of the LiDAR sensor with respect to the vehicle based on the spatial relationship between the images of the fixed road features and the field of view of the LiDAR sensor.

10. The method of claim 9, wherein:
the road fixed features comprise one or more pairs of lane markings on either side of the vehicle;
analyzing the spatial relationship comprises determining a pitch angle between one pair of lane markings of the one or more pairs of lane markings and the field of view of the LiDAR sensor; and
determining the deviation from the expected alignment of the LiDAR sensor comprises determining a pitch error of the LiDAR sensor based on the pitch angle.

11. A method of calibrating a LiDAR sensor mounted on a vehicle, the method comprising:
acquiring, using the LiDAR sensor while the vehicle is traveling on a road with fixed road features, one or more three-dimensional images, each of the one or more three-dimensional images including images of the fixed road features;
analyzing a spatial relationship between the images of the fixed road features in the one or more three-dimensional images and an orientation of a field of view of the LiDAR sensor; and
determining a deviation from an expected alignment of the LiDAR sensor with respect to the vehicle based on the spatial relationship between the images of the fixed road features and the field of view of the LiDAR sensor.

12. The method of claim 11, further comprising:
re-calibrating the LiDAR sensor based on the deviation from the expected alignment of the LiDAR sensor with respect to the vehicle.

13. The method of claim 11, further comprising:
determining that the deviation from the expected alignment of the LiDAR sensor exceeds a threshold; and
providing an alert in response to determining that the deviation from the expected alignment of the LiDAR sensor exceeds the threshold.

14. The method of claim 11, wherein:
the fixed road features comprise one or more pairs of lane markings on either side of the vehicle;
analyzing the spatial relationship comprises determining a pitch angle between one pair of lane markings of the one or more pairs of lane markings and the field of view of the LiDAR sensor; and
determining the deviation from the expected alignment of the LiDAR sensor comprises determining a pitch error of the LiDAR sensor based on the pitch angle.

15. The method of claim 11, wherein:
the fixed road features comprise one or more pairs of lane markings on either side of the vehicle;
the one or more pairs of lane markings include a first lane marking on a driver side of the vehicle and a second lane marking on a passenger side of the vehicle;
analyzing the spatial relationship comprises determining a height difference between the first lane marking and the second lane marking; and
determining the deviation from the expected alignment of the LiDAR sensor comprises determining a roll error of the LiDAR sensor based on the height difference.

16. The method of claim 11, wherein:
the fixed road features comprise one or more pairs of lane markings on either side of the vehicle; and
the one or more three-dimensional images comprise a plurality of three-dimensional images acquired by the LiDAR sensor over an interval of time as the vehicle is traveling on the road for an interval of distance.

17. The method of claim 16, wherein the road is substantially straight and level over the interval of distance.

18. The method of claim 16, further comprising:
determining a path of the vehicle over the interval of distance; and
comparing the path of the vehicle to paths of the fixed road features from the plurality of three-dimensional images.

19. The method of claim 18 wherein:
the one or more pairs of lane markings include a first lane marking on a driver side of the vehicle and a second lane marking on a passenger side of the vehicle;
analyzing the spatial relationship comprises determining an amount of lateral asymmetry between the first lane marking from the path of the vehicle and the second lane marking from the path of the vehicle; and
determining the deviation from the expected alignment of the LiDAR sensor comprises determining a yaw error of the LiDAR sensor based on the amount of lateral asymmetry.

20. The method of claim 18, wherein:
analyzing the spatial relationship comprises determining a height difference between one pair of lane markings and the path of the vehicle; and
determining the deviation from the expected alignment of the LiDAR sensor comprises determining a vertical error of the LiDAR sensor based on the height difference.

* * * * *